(12) United States Patent
Ganju et al.

(10) Patent No.: US 11,836,909 B2
(45) Date of Patent: Dec. 5, 2023

(54) ACTIVE LEARNING OF PRODUCT INSPECTION ENGINE

(71) Applicant: Mellanox Technologies, Ltd., Yokneam (IL)

(72) Inventors: Siddha Ganju, Santa Clara, CA (US); Elad Mentovich, Tel Aviv (IL); David Greenlaw, Palo Alto, CA (US); Tony Altinis, Cupertino, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 46 days.

(21) Appl. No.: 17/584,914

(22) Filed: Jan. 26, 2022

(65) Prior Publication Data
US 2023/0237635 A1 Jul. 27, 2023

(51) Int. Cl.
*G06T 7/00* (2017.01)
*G06V 10/774* (2022.01)
*G06V 10/762* (2022.01)
*G06T 7/10* (2017.01)

(52) U.S. Cl.
CPC .............. *G06T 7/0004* (2013.01); *G06T 7/10* (2017.01); *G06V 10/762* (2022.01); *G06V 10/7747* (2022.01); *G06T 2207/20081* (2013.01); *G06T 2207/20092* (2013.01)

(58) Field of Classification Search
CPC ......... G06T 7/0006; G06T 2207/20016; G06T 7/001; G06T 2207/20084; G06F 18/211; G06V 2201/06
See application file for complete search history.

(56) References Cited

U.S. PATENT DOCUMENTS

| | | | |
|---|---|---|---|
| 6,990,255 B2 * | 1/2006 | Romanik | G06T 5/50 382/284 |
| 7,056,119 B2 * | 6/2006 | Cabato | F41H 5/266 434/69 |
| 8,346,483 B2 * | 1/2013 | Kil | G01N 1/06 702/19 |

(Continued)

OTHER PUBLICATIONS

Paul, Sayak et al. "Flood Segmentation on Sentinel-1 SAR Imagery With Semi-Supervised Learning," arXiv Preprint arXiv: 2107. 08369v4 [cs.CV] Oct. 25, 2021, pp. 1-12 pages. Available online at: <URL: https://arxiv.org/pdf/2107.08369.pdf>.

*Primary Examiner* — Yosef Kassa
(74) *Attorney, Agent, or Firm* — Moore & Van Allen PLLC; Anup Iyer

(57) ABSTRACT

A computing entity is described that obtains at least one inspection image of an at least partially fabricated product and causes the at least one inspection image to be processed by a product inspection engine. The product inspection engine includes a machine learning-trained model. The computing entity obtains an inspection result determined based on the processing of the at least one inspection image by the product inspection engine; identifies one or more training images stored in an image database based at least in part on the at least one inspection image; associates automatically generated labeling data with the one or more training images based at least in part on the inspection result determined by the processing of the at least one inspection image; and causes training of the product inspection engine using the one or more training images and the associated labeling data.

22 Claims, 9 Drawing Sheets

(56) References Cited

U.S. PATENT DOCUMENTS

| | | | | |
|---|---|---|---|---|
| 8,478,033 B2* | 7/2013 | Kim | ................ | G06T 7/0002 |
| | | | | 358/1.9 |
| 8,917,903 B2* | 12/2014 | Yamakawa | ............ | B41J 3/543 |
| | | | | 382/137 |
| 9,002,072 B2* | 4/2015 | Tarnowski | .......... | G06V 10/945 |
| | | | | 250/559.01 |
| 9,183,443 B2* | 11/2015 | Eames | ............... | G06F 3/0485 |
| 9,710,729 B2* | 7/2017 | Chidlovskii | ........ | G06F 18/2148 |
| 10,223,784 B2* | 3/2019 | Ushiba | ............. | G01N 21/9501 |
| 10,509,979 B2* | 12/2019 | Chen | ................. | G01V 5/0016 |

\* cited by examiner

ACTIVE LEARNING OF PRODUCT INSPECTION ENGINE

TECHNICAL FIELD

Various embodiments of the present disclosure address technical challenges related to the training of a machine learning-trained model of a product inspection engine. Various embodiments of the present disclosure relate to active learning of a product inspection engine comprising a machine learning-trained model and some example uses thereof.

BACKGROUND

In various manufacturing and product fabrication facilities, visual inspection is used to identify products that are expected to fail or not function properly. However, due to the limitations of human vision, a number of products that should be flagged for further review may be missed. Various embodiments address these and other technical challenges related to visual inspection of products.

BRIEF SUMMARY

Various embodiments provide methods, apparatus, systems, computing devices, computing entities, and/or the like for actively training a machine learning-trained model of a product inspection engine configured to perform an automated visual inspection of an at least partially fabricated product. In various embodiments, the active training of the product inspection engine comprises identifying and associating labeling data with new training images based on results of processing inspection images corresponding to the at least partially fabricated product in an automated manner. Various embodiments are configured to control the routing of the at least partially fabricated product through the fabrication facility, determine a root cause of products identified as likely faulty, identify fabrication components that may require maintenance and/or repair, and/or the like.

In accordance with one aspect, a method for actively training a product inspection engine configured to perform a visual inspection of an at least partially fabricated product is provided. In an example embodiment, the method comprises obtaining at least one inspection image of an at least partially fabricated product and causing the at least one inspection image to be processed by a product inspection engine. The product inspection engine comprises a machine learning-trained model. The method further comprises obtaining an inspection result determined based on the processing of the at least one inspection image by the product inspection engine; identifying one or more training images from a plurality of images stored in an image database based at least in part on the at least one inspection image; associating automatically generated labeling data with the one or more training images based at least in part on the inspection result determined by the processing of the at least one inspection image; and causing training of the product inspection engine using the one or more training images and labeling data associated with respective ones of the one or more training images. The labeling data associated with respective ones of the one or more training images comprises respective portions of the automatically generated labeling data.

In an example embodiment, the method further comprises receiving a functional test result corresponding to the at least partially fabricated product shown in the at least one inspection image; and causing the functional test result to be provided to the product inspection engine, wherein the product inspection engine processes the at least one inspection image based at least in part on the functional test result.

In an example embodiment, the labeling data associated with a training image of the one or more training images comprises human annotation data generated based at least in part on user input and the automatically generated labeling data.

In an example embodiment, the method further comprises causing a training image of the one or more training images and at least a portion of the automatically generated labeling data to be displayed via a display of a user interface; and receiving user input indicating the human annotation data.

In an example embodiment, wherein the product inspection engine is configured to divide the at least one analysis image into a plurality of segments and process each segment of the plurality of segments individually, and the inspection result is based at least in part on the processing of each segment.

In an example embodiment, a routing of the at least partially fabricated product within a fabrication facility is performed based at least in part on the inspection result.

In example embodiment, the at least one inspection image is associated with meta data indicating at least one of (a) one or more fabrication components or (b) one or more human technicians that were involved in fabricating the at least partially fabricated product.

In an example embodiment, the meta data associated with the at least one inspection image is processed by a root cause engine when the result of processing the at least one inspection image with the product inspection engine indicates that a resulting product is likely to fail, wherein the root cause engine comprises a machine learning-trained model.

In an example embodiment, the method further comprises causing a root cause engine to process a plurality of inspection images that are associated with respective inspection results for respective at least partially fabricated products to determine one or more clusters of inspection images of the plurality of inspection images, wherein each cluster of the one or more clusters comprises inspection images of the plurality of inspection images having a common feature.

In an example embodiment, the method further comprises providing, via a user interface, information regarding the common feature.

In an example embodiment, the at least partially fabricated product is at least a portion of a circuit board, a photonic circuit, or an electro-optical device.

In an example embodiment, the one or more training images are identified as (a) being substantially similar to the at least one inspection image or (b) having a first segment that is substantially similar to a second segment of the at least one inspection image.

In accordance with another aspect, a computer program product configured to actively train a product inspection engine configured to perform a visual inspection of an at least partially fabricated product is provided. The computer program product may comprise at least one computer-readable storage medium having computer-readable program code portions stored therein. The computer-readable program code portions comprise executable portions configured to, when executed by one or more processors, cause the one or more processor to obtain at least one inspection image of an at least partially fabricated product and cause the at least one inspection image to be processed by a product inspection engine. The product inspection engine comprises a machine learning-trained model. The computer-readable program code portions comprise executable portions further configured to, when executed by the one or more processors, cause the one or more processors to obtain an inspection result determined based on the processing of the at least one inspection image by the product inspection engine; identify one or more training images from a plurality of images stored in an image database based at least in part on the at least one inspection image; associate automatically generated labeling data with the one or more training images based at least in part on the inspection result determined by the processing of the at least one inspection image; and cause training of the product inspection engine using the one or more training images and labeling data associated with respective ones of the one or more training images. The labeling data associated with a training image includes the automatically generated labeling data for the training image.

In an example embodiment, the computer-readable program code portions comprise executable portions further configured to, when executed by one or more processors, cause the one or more processors to receive a functional test result corresponding to the at least partially fabricated product shown in the at least one inspection image; and cause the functional test result to be provided to the product inspection engine, wherein the product inspection engine processes the at least one inspection image based at least in part on the functional test result.

In an example embodiment, labeling data associated with a training image of the one or more training images comprises human annotation data generated based at least in part on user input and the automatically generated labeling data.

In an example embodiment, the computer-readable program code portions comprise executable portions further configured to, when executed by one or more processors, cause the one or more processors to cause a training image of the one or more training images and at least a portion of the automatically generated labeling data to be displayed via a display of a user interface; and receive user input indicating the human annotation data.

In an example embodiment, wherein the product inspection engine is configured to divide the at least one analysis image into a plurality of segments and process each segment of the plurality of segments individually, and the inspection result is based at least in part on the processing of each segment.

In an example embodiment, a routing of the at least partially fabricated product within a fabrication facility is performed based at least in part on the inspection result.

In example embodiment, the at least one inspection image is associated with meta data indicating at least one of (a) one or more fabrication components or (b) one or more human technicians that were involved in fabricating the at least partially fabricated product.

In an example embodiment, the meta data associated with the at least one inspection image is processed by a root cause engine when the result of processing the at least one inspection image with the product inspection engine indicates that a resulting product is likely to fail, wherein the root cause engine comprises a machine learning-trained model.

In an example embodiment, the computer-readable program code portions comprise executable portions further configured to, when executed by one or more processors, cause the one or more processors to cause a root cause engine to process a plurality of inspection images that are associated with respective inspection results for respective at least partially fabricated products to determine one or more clusters of inspection images of the plurality of inspection images, wherein each cluster of the one or more clusters comprises inspection images of the plurality of inspection images having a common feature.

In an example embodiment, the computer-readable program code portions comprise executable portions further configured to, when executed by one or more processors, cause the one or more processors to provide, via a user interface, information regarding the common feature.

In an example embodiment, the at least partially fabricated product is at least a portion of a circuit board, a photonic circuit, or an electro-optical device.

In an example embodiment, the one or more training images are identified as (a) being substantially similar to the at least one inspection image or (b) having a first segment that is substantially similar to a second segment of the at least one inspection image.

In accordance with yet another aspect, an apparatus comprising at least one processor and at least one memory including computer program code is provided. In one embodiment, the at least one memory and the computer program code are configured to, with the at least one processor, cause the apparatus to obtain at least one inspection image of an at least partially fabricated product and cause the at least one inspection image to be processed by a product inspection engine. The product inspection engine comprises a machine learning-trained model. The at least one memory and the computer program code are further configured to, with the at least one processor, cause the apparatus to obtain an inspection result determined based on the processing of the at least one inspection image by the product inspection engine; identify one or more training images from a plurality of images stored in an image database based at least in part on the at least one inspection image; associate automatically generated labeling data with the one or more training images based at least in part on the inspection result determined by the processing of the at least one inspection image; and cause training of the product inspection engine using the one or more training images and labeling data associated with respective ones of the one or more training images. The labeling data associated with a training image includes the automatically generated labeling data for the training image.

In an example embodiment, the at least one memory and the computer program code are further configured to, with the at least one processor, cause the apparatus to receive a functional test result corresponding to the at least partially fabricated product shown in the at least one inspection image; and cause the functional test result to be provided to the product inspection engine, wherein the product inspection engine processes the at least one inspection image based at least in part on the functional test result.

In an example embodiment, the labeling data associated with a training image of the one or more training images comprises human annotation data generated based at least in part on user input and the automatically generated labeling data.

In an example embodiment, the at least one memory and the computer program code are further configured to, with the processor, cause the apparatus to a training image of the one or more training images and at least a portion of the automatically generated labeling data to be displayed via a display of a user interface; and receive user input indicating the human annotation data.

In an example embodiment, wherein the product inspection engine is configured to divide the at least one analysis image into a plurality of segments and process each segment of the plurality of segments individually, and the inspection result is based at least in part on the processing of each segment.

In an example embodiment, a routing of the at least partially fabricated product within a fabrication facility is performed based at least in part on the inspection result.

In example embodiment, the at least one inspection image is associated with meta data indicating at least one of (a) one or more fabrication components or (b) one or more human technicians that were involved in fabricating the at least partially fabricated product.

In an example embodiment, the meta data associated with the at least one inspection image is processed by a root cause engine when the result of processing the at least one inspection image with the product inspection engine indicates that a resulting product is likely to fail, wherein the root cause engine comprises a machine learning-trained model.

In an example embodiment, the at least one memory and the computer program code are further configured to, with the processor, cause the apparatus to cause a root cause engine to process a plurality of inspection images that are associated with respective inspection results for respective at least partially fabricated products to determine one or more clusters of inspection images of the plurality of inspection images, wherein each cluster of the one or more clusters comprises inspection images of the plurality of inspection images having a common feature.

In an example embodiment, the at least one memory and the computer program code are further configured to, with the processor, cause the apparatus to provide, via a user interface, information regarding the common feature.

In an example embodiment, the at least partially fabricated product is at least a portion of a circuit board, a photonic circuit, or an electro-optical device.

In an example embodiment, the one or more training images are identified as (a) being substantially similar to the at least one inspection image or (b) having a first segment that is substantially similar to a second segment of the at least one inspection image.

BRIEF DESCRIPTION OF THE DRAWINGS

Figure 1:
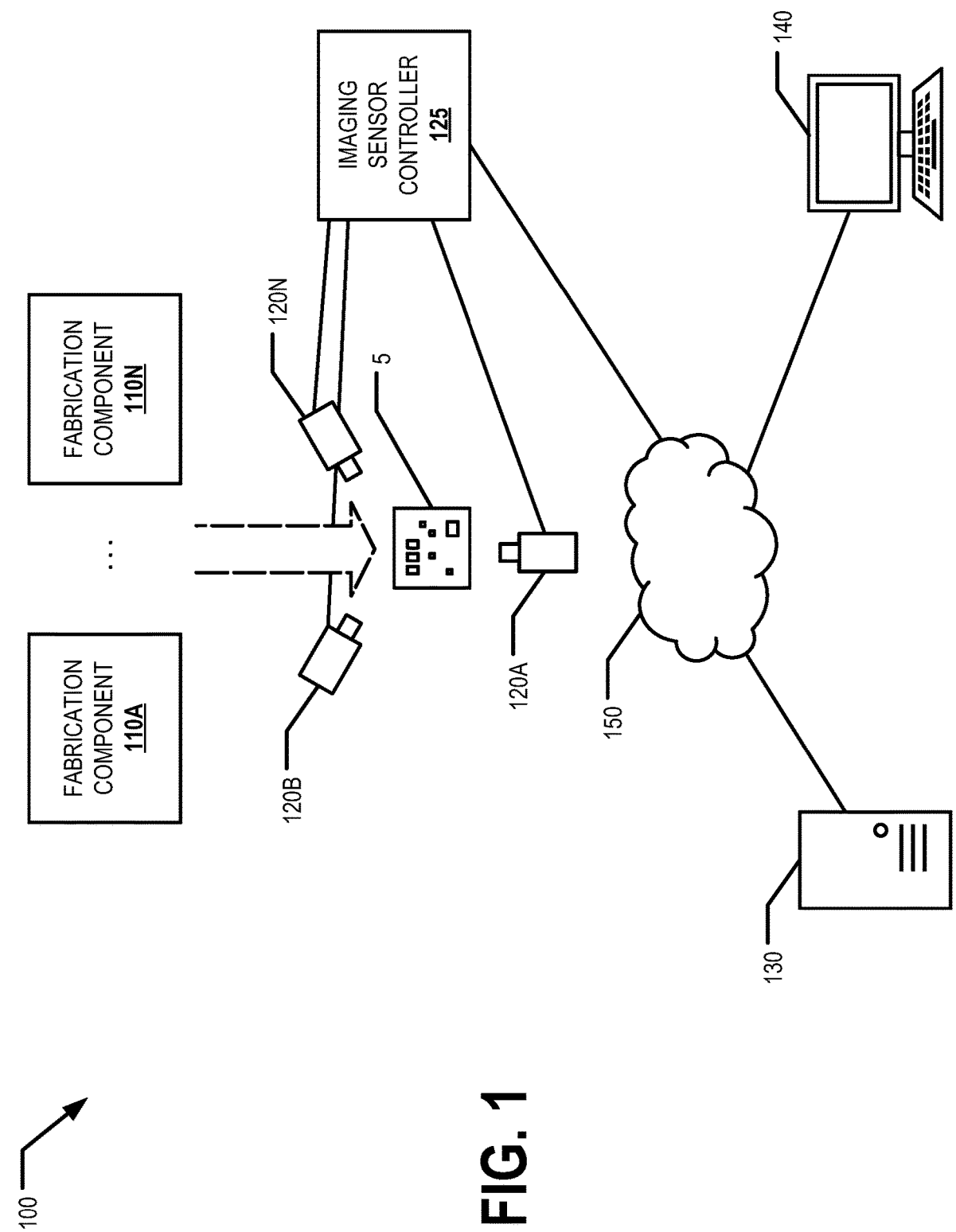
Figure 2:
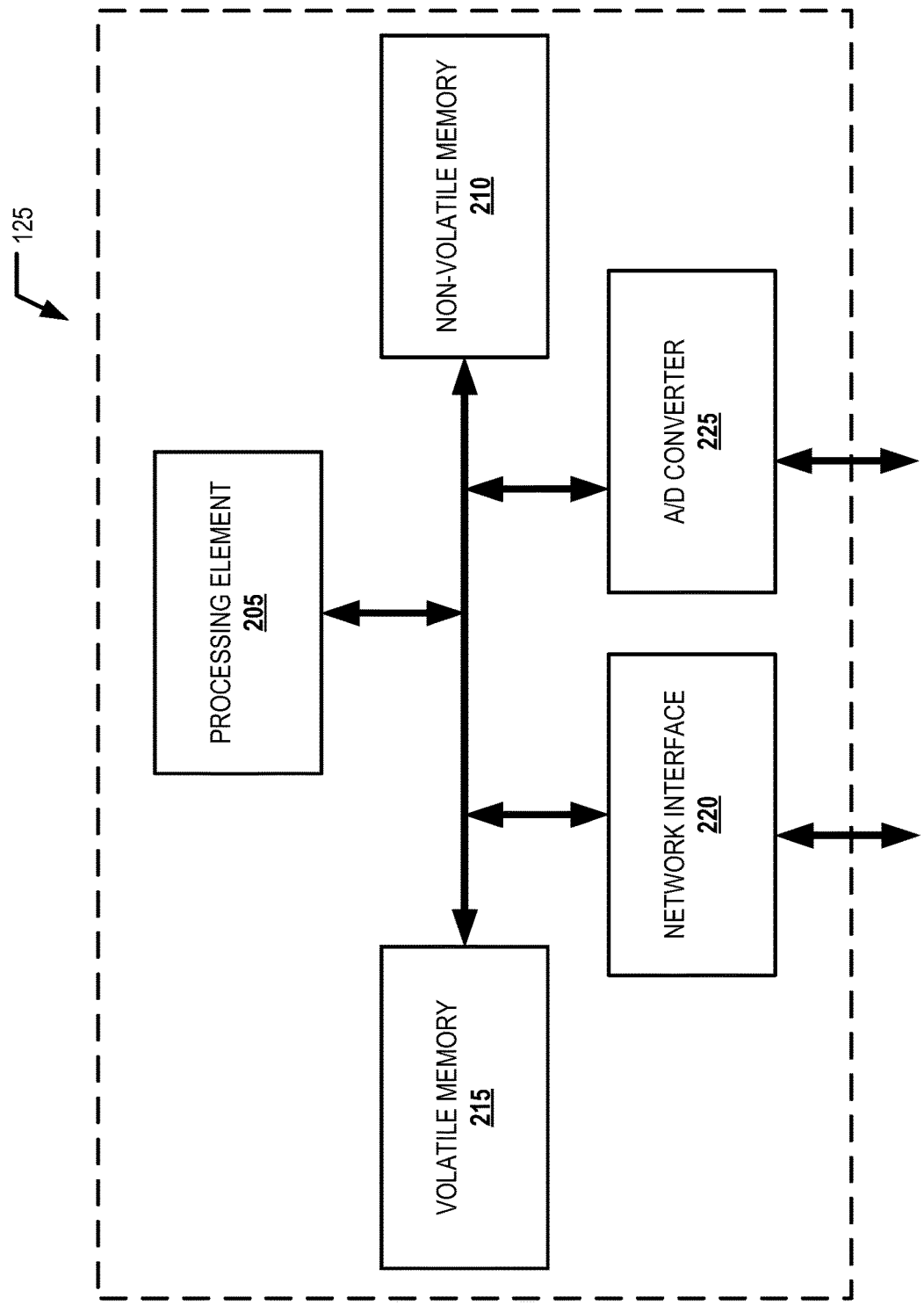
Figure 3:
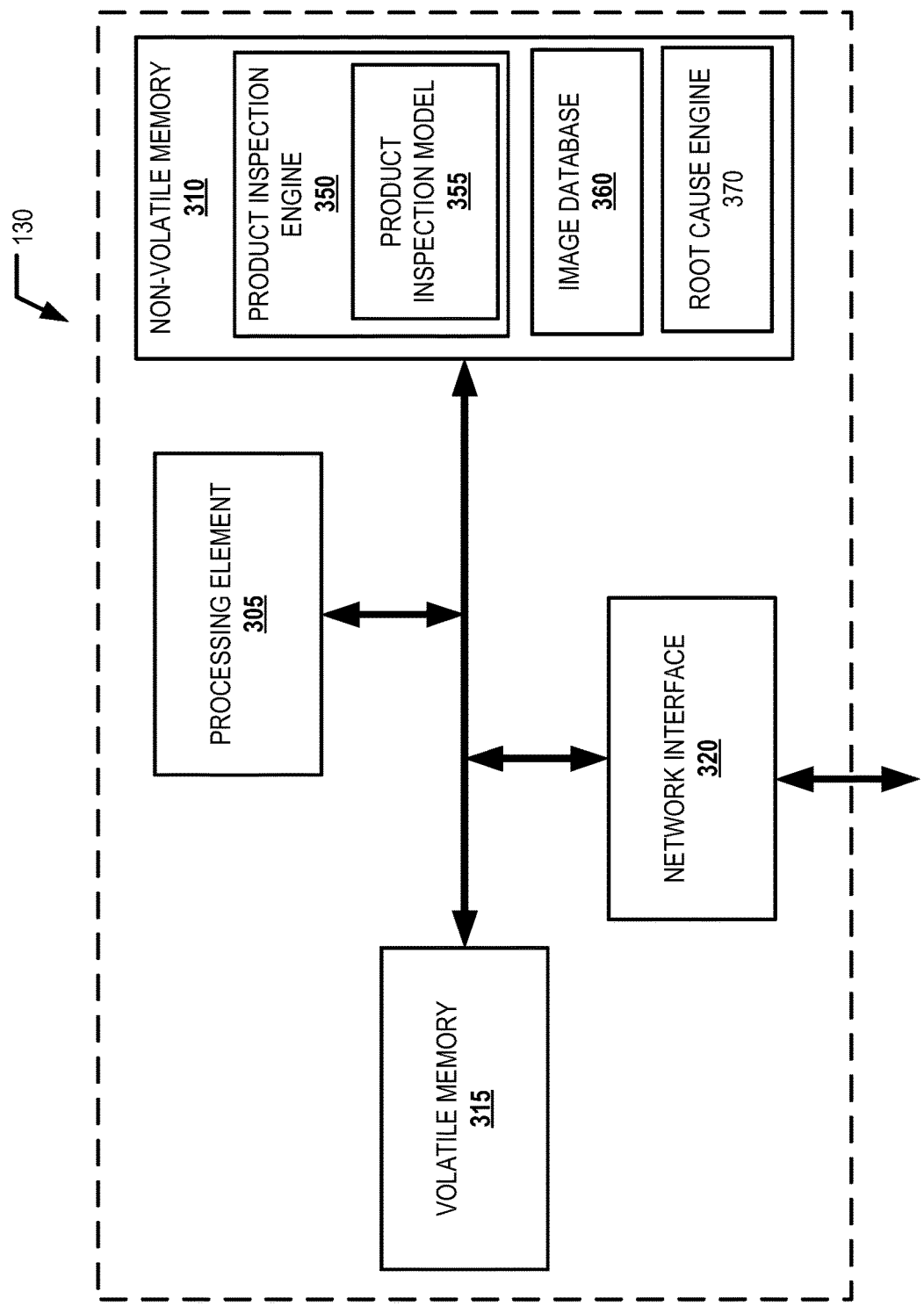
Figure 4:
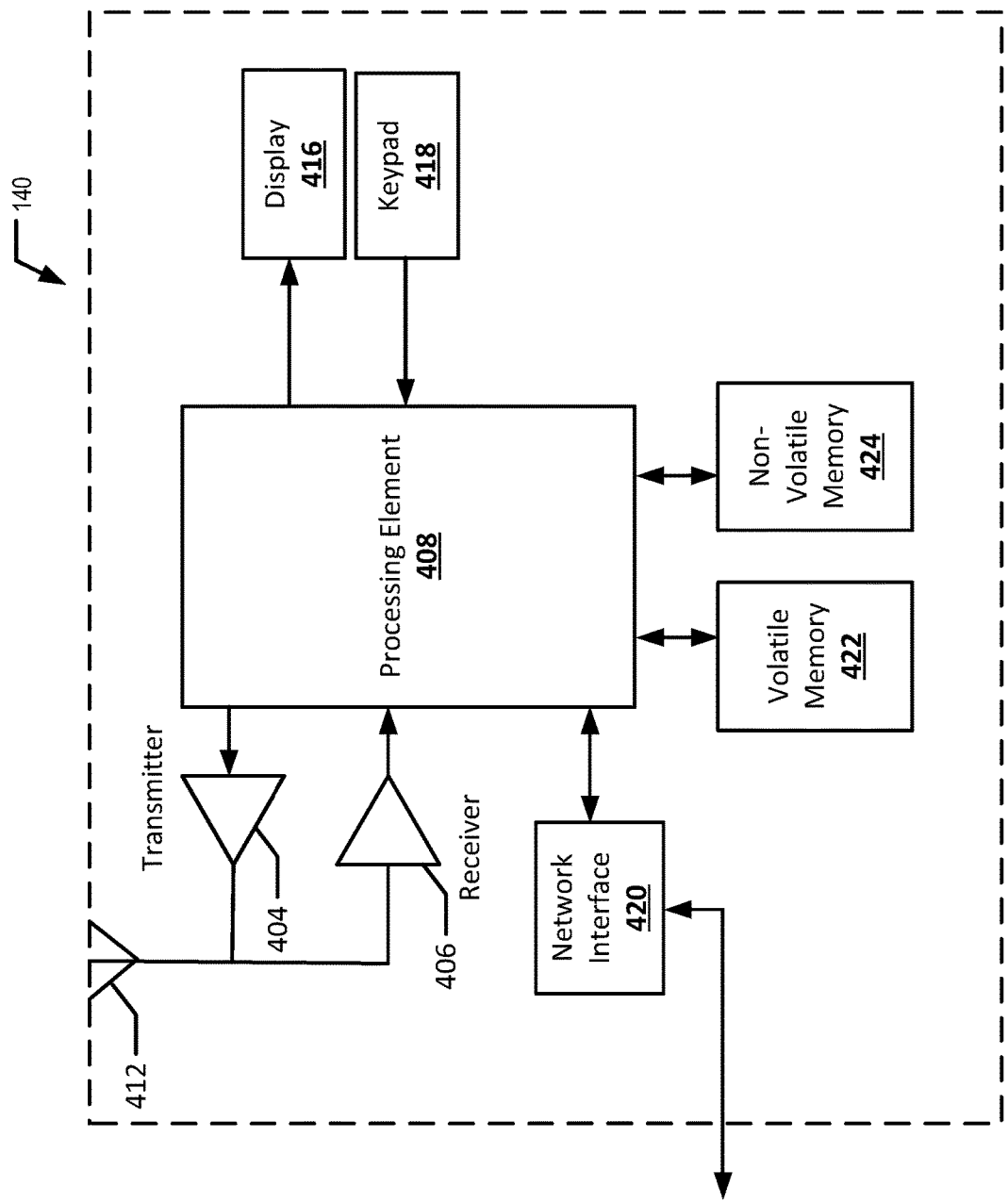
Figure 5:
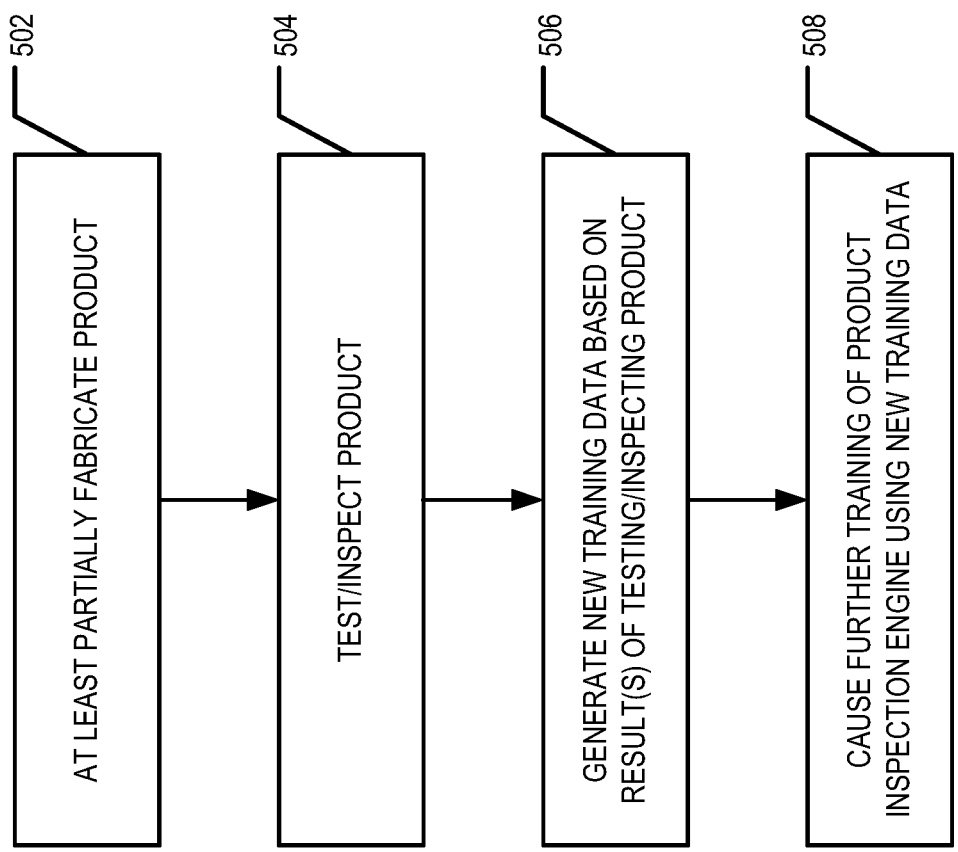
Figure 6:
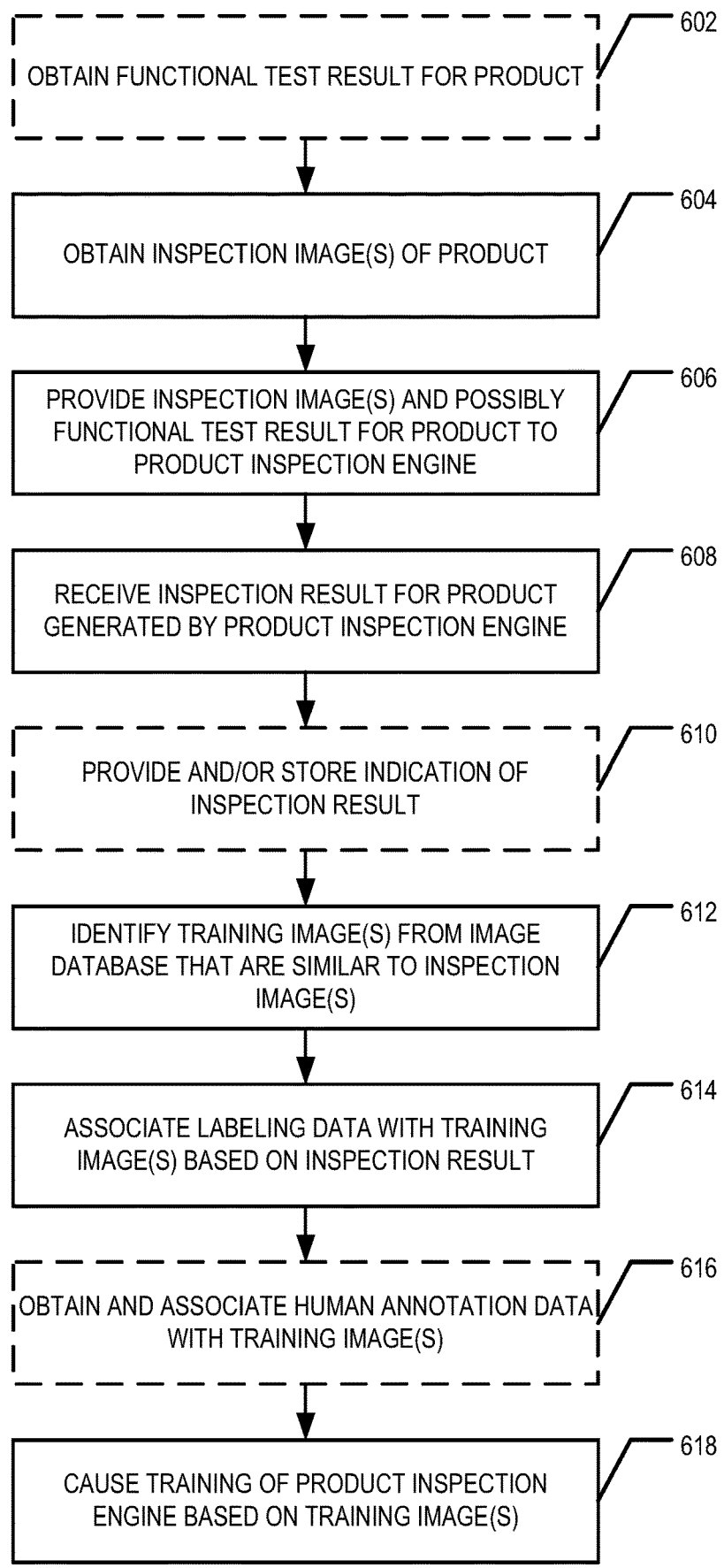
Figure 7:
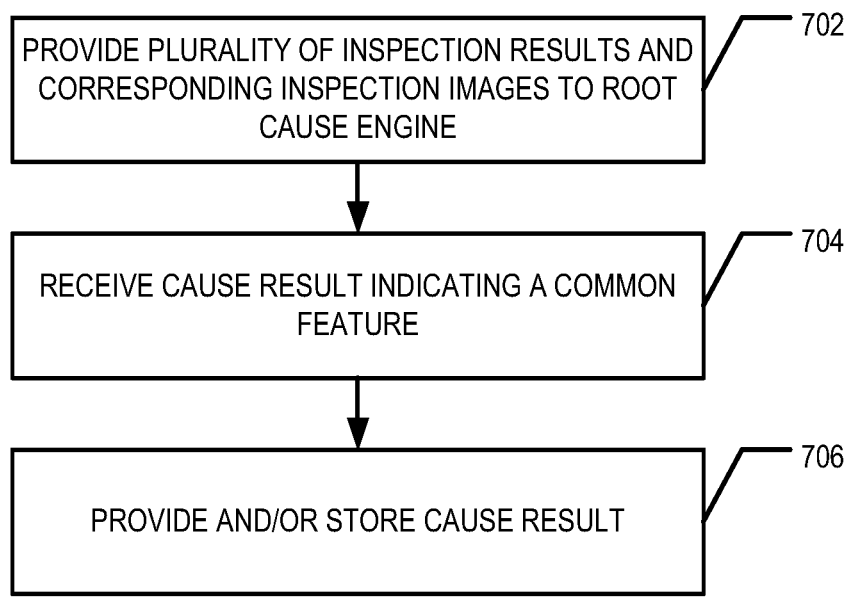
Figure 8:
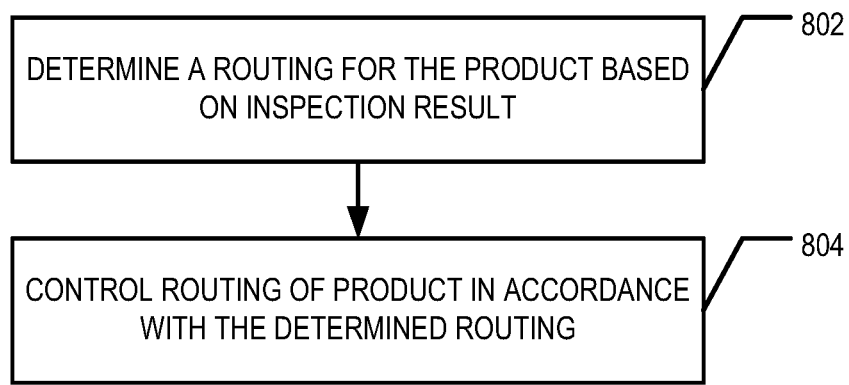
Figure 9:
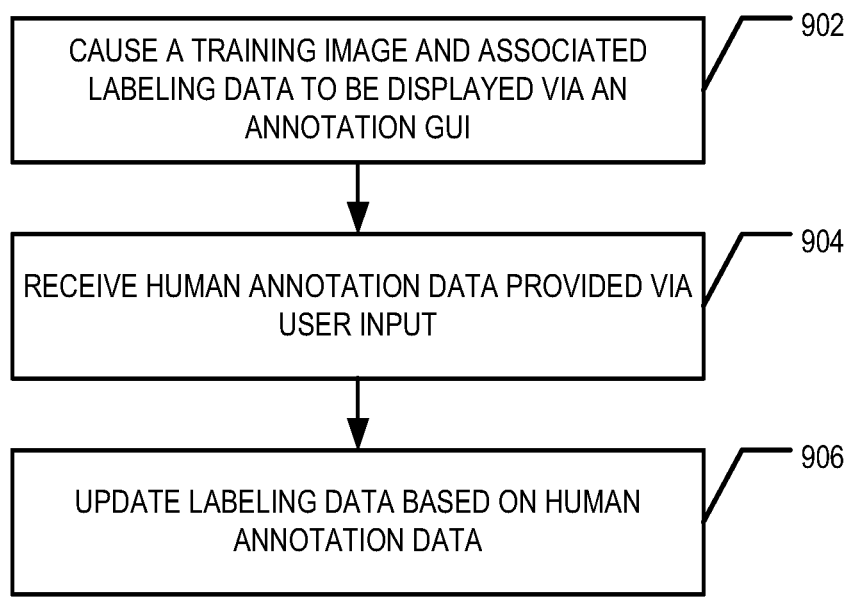
Figure 10:
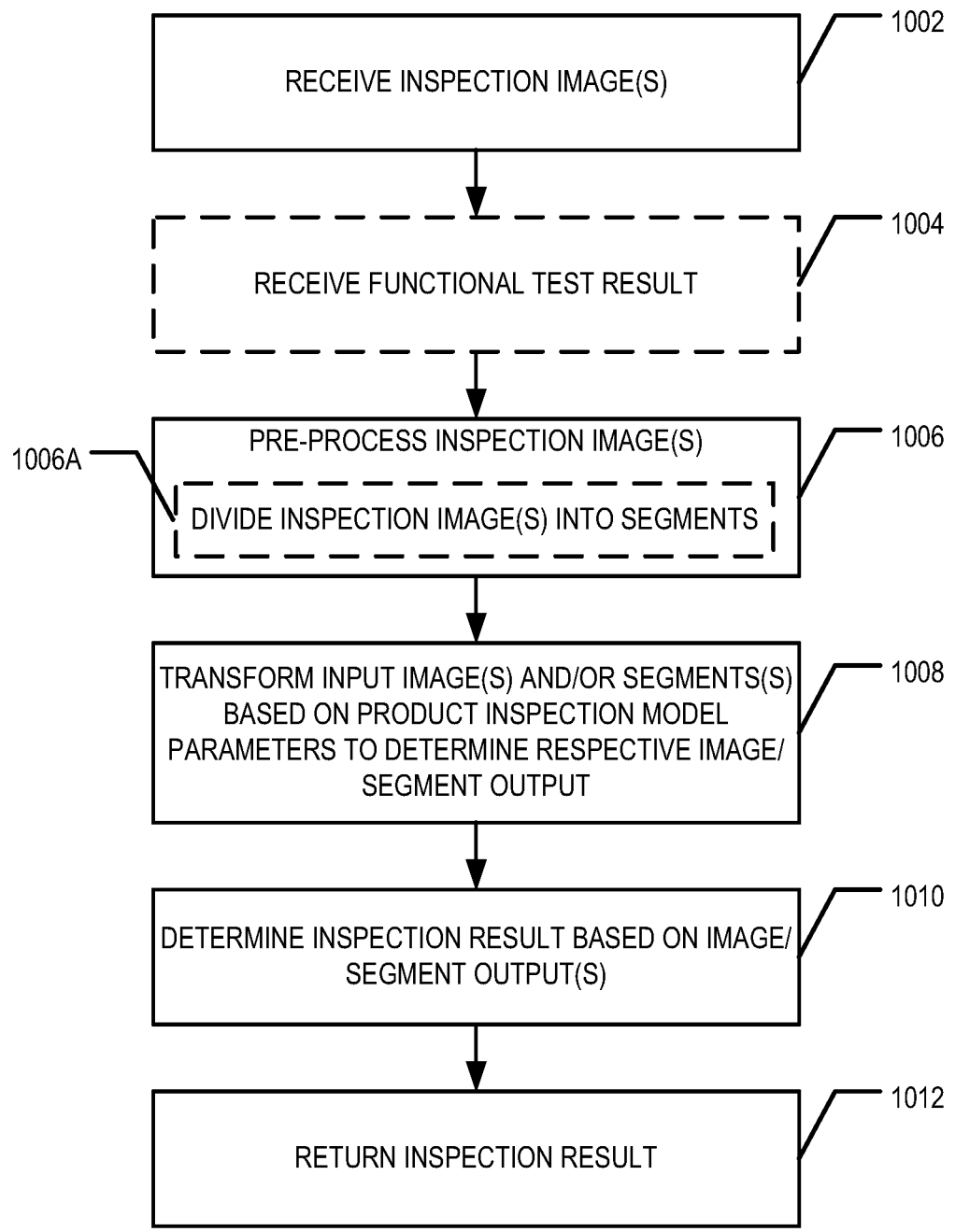

Having thus described the invention in general terms, reference will now be made to the accompanying drawings, which are not necessarily drawn to scale, and wherein:

FIG. 1 illustrates an overview of an example architecture that can be used to practice embodiments of the present invention;

FIG. 2 illustrates an example imaging sensor controller in accordance with some embodiments discussed herein;

FIG. 3 illustrates an example computing entity in accordance with some embodiments discussed herein;

FIG. 4 illustrates an example client device in accordance with some embodiments discussed herein;

FIG. 5 is a flowchart diagram of an example process for actively training a product inspection engine in accordance with some embodiments discussed herein;

FIG. 6 is a flowchart diagram of an example process performed by the computing entity of FIG. 3, for example, for actively training a product inspection engine in accordance with some embodiments discussed herein;

FIG. 7 is a flowchart diagram of an example process performed by the computing entity of FIG. 3, for example, for performing a root cause analysis in accordance with some embodiments discussed herein;

FIG. 8 is a flowchart diagram of an example process performed by the computing entity of FIG. 3, for example, for controlling the routing of a product through at least a portion of a fabrication facility based on a respective inspection result in accordance with some embodiments discussed herein;

FIG. 9 is a flowchart diagram of an example process performed by the computing of FIG. 3, for example, for obtaining human annotation data for a new training image in accordance with some example embodiment discussed herein; and FIG. 10 is flowchart diagram of an example operational flow of a product inspection engine executed by the computing entity of FIG. 3, for example, in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. The terms "approximately" and "substantially" refer to within appropriate engineering and/or manufacturing tolerances.

I. OVERVIEW

Various embodiments provide methods, apparatus, systems, computing devices, computing entities, and/or the like for actively training a machine learning-trained model of a product inspection engine configured to perform an automated visual inspection of an at least partially fabricated product. In various embodiments, the active training of the product inspection engine comprises identifying and associating labeling data with new training images based on results of processing inspection images corresponding to the at least partially fabricated product in an automated manner. Various embodiments are configured to control the routing of the at least partially fabricated product through the fabrication facility, determine a root cause of products identified as likely faulty, identify fabrication components that may require maintenance and/or repair, and/or the like.

In various embodiments, one or more inspection images of an at least partially fabricated product are captured by one or more image sensors. In various embodiments, the image sensors comprise optical image sensors (e.g., charged coupled device (CCD) image sensors, complementary metal-oxide-semiconductor (CMOS) image sensors, and/or the like), infrared (IR) image sensors, thermal image sensors, ultrasound image sensors, radar image sensors, lidar image sensors, and/or the like, and/or combinations thereof. The one or more inspection images are provided as input to a product inspection engine. In various embodiments, the product inspection engine comprises a machine learning-trained model configured to process inspection images to perform a visual inspection thereof. The product inspection engine provides an inspection result that provides an indication of whether the resulting product (e.g., formed by finishing the fabrication of the at least partially fabricated product) is likely to fail, the likelihood that the resulting product is likely to fail, identification of a particular portion of the at least partially fabricated product that is likely to cause the resulting product to fail, the likelihood that a particular portion of the at least partially fabricated product is likely to cause the resulting product to fail, a class identified for the at least partially fabricated product, and/or the like. In various embodiments, the inspection result and the one or more inspection images are used to identify one or more training images from an image database. For example, training images may be identified from a plurality of images stored in the image database based at least in part on the training images being similar in at least one aspect and/or in at least one segment of the image to an inspection image of the one or more inspection images. Labelling data is automatically associated with the one or more training images based at least in part on the inspection result corresponding to the one or more inspection images used to identify one or more training images. The product inspection engine is then retrained and/or further trained using the one or more training images. Thus, the product inspection engine (e.g., the machine learning-trained model thereof) is actively trained with a growing set of training data that is generated in an at least semi-automated manner. As used herein, the term "actively training" refers to the continued training of a machine learning trained model while the model is being used in the fabrication facility, for example. In various embodiments, the active learning of the product analysis model enables the product analysis model to learn to analyze new versions of products, new (similar) products, and/or the like without requiring a new model to be trained. In various embodiments, the product analysis model is a self-learning model. For example, in an example embodiment, the product analysis model does not need to operate from a fixed set of classes and/or error types to classify inspection images. Rather, the product analysis model can determine and/or learn to distinguish (fine-grain) classes and/or error types over time. In various embodiments, the active learning of the product analysis model enables the product analysis model to achieve better accuracy in the determination and/or identification of at least partially fabricated products that are likely to fail as time progresses.

In various embodiments, the labelling data that is associated with a training image is augmented with human annotation data. For example, the training image and the automatically determined and/or generated labeling data may be displayed via a display of a user interface such that a user (e.g., a trained human visual inspector) may review and/or analyze the training image and the automatically determined labeling data and may provide user input via the user interface. In various embodiments, the automatically determined and/or generated labeling data may indicate a portion or segment of a training image, indicate a possible reason for a particular class being associated with the training image, indicate the particular class associated with the training image, and/or otherwise provide annotation guidance for the human visual inspector. The user input may comprise and/or indicate human annotation data. The human annotation data may then be stored as part of the labelling data of the respective training image, in an example embodiment.

In various embodiments, the inspection result for an at least partially fabricated product is used to determine a routing of the at least partially fabricated product through the fabrication facility. For example, when the inspection result indicates that the at least partially fabricated product is not likely to fail, the at least partially fabricated product may be routed to a next step in the fabrication and/or packaging of the at least partially fabricated product. When the inspection result indicates that the at least partially fabricated product is likely to fail, the at least partially fabricated product may be routed for additional testing and/or for removal from the fabrication process.

In various embodiments, respective inspection results are generated and/or determined for a plurality of at least partially fabricated products (e.g., within a particular time period in an example embodiment). The respective inspection results, the corresponding inspection images, and meta data associated with the corresponding inspection images may be provided to a root cause engine. In various embodiments, the root cause engine is a machine learning trained model. The root cause engine may determine one or more common features of at least partially fabricated products that were identified as likely to fail. For example, the likely to fail at least partially fabricated products may have been at least partially fabricated by a common fabrication component, having a common physical feature that caused the at least partially fabricated products to be identified as likely to fail, and/or the like. For example, in an example embodiment where the at least partially fabricated products are circuit boards, the common physical feature may be that a soldering of a circuit board element to the board is incomplete or too much solder was applied such that a bridge was formed between circuit board elements. Continuing with the circuit board example, the root cause engine may determine that the at least partially fabricated products exhibiting the soldering issues were soldered by a particular fabricating component, indicating that the particular fabricating component may require maintenance, repair, and/or the like.

Conventionally, products are visually inspected by human inspectors. However, human sight presents limitations. Additionally intra-inspector and inter-inspector variability reduces the accuracy of human inspection of a large number of products. However, the identification and annotation of the training data required for training a robust machine learning-trained model is a significant task that requires a large number of hours of work performed by highly trained human inspectors. Moreover, minor changes to the product, let alone re-designs of a new product or new products, conventionally require training a new model and thus require additional hours of work to identify and annotate training data for the re-designed or new product. Thus, technical challenges exist regarding the training of a robust model for use in performing visual inspections of products.

Various embodiments provide technical solutions to these technical challenges. For example, various embodiments automatically identify new training images and automatically associate labeling data with the new training images based at least in part on inspection images and the corresponding inspection results. Thus, a large amount of training data can be efficiently generated. Additionally, at least some of the new training images and the associated labelling data may be presented to a user (e.g., a trained human inspector) who may provide user input providing human annotation data that may augment the automatically determined labelling data. The new training data and the associated labeling data (that may contain human annotated data) are used to actively train the product analysis model. Thus, the accuracy of the product analysis model improves over time and is robust against minor changes in the product, re-designs of the product, and/or new, similar products, in various embodiments. As such, various embodiments provide technical improvements to the field of product inspection and/or machine learning model training.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or that are functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example architecture 100 for the use and active training of a product inspection engine comprising a machine learning-trained model configured to process inspection images. The architecture 100 includes one or more imaging sensors 120 (e.g., 120A, 120B, 120N) configured to capture one or more inspection images of at least partially fabricated products 5. In various embodiments, each of the at least partially fabricated products 5 were fabricated by a respective at least one of one or more fabrication components 110 (e.g., 110A, 110N). The architecture 100 further includes an imaging sensor controller 125 configured to control the operation of the one or more imaging sensors 120 and to receive imaging data captured by the one or more imaging sensors 120.

The architecture 100 further comprises one or more computing entities 130. In various embodiments, the computing entity 130 is a server or Cloud-based computational resource. For example, the computing entity 130 is configured to execute a product inspection engine, actively train a product inspection engine, execute a root cause engine, and/or the like in various embodiments. In an example embodiment, the imaging sensor controller 125 converts the imaging data into images (e.g., via A/D converter 225 and/or the like) and provides the images to the computing entity 130. In an example embodiment, the imaging sensor controller 125 provides the imaging data to the computing entity 130 and the computing entity 130 converts the imaging data into images. For example, the computing entity 130 is configured to receive imaging data and/or inspection images, in various embodiments.

The architecture 100 may further comprise one or more client devices 140. In various embodiments, the client devices 140 are clients of the computing entity 130 and/or configured to be controlled at least in part by the computing entity 130 and/or information/data provided by the computing entity 130. In various embodiments, a client device 140 is a user device such as a desktop computer, laptop, tablet, handheld device, smartphone, and/or the like. In an example embodiment, a client device 140 is configured to display a training image and associated labeling data to a user and receive human annotation data via a user interface thereof.

In an example embodiment, the imaging sensor controller 125, computing entity 130, and/or client device 140 are in direct wired or wireless communication with one another. In various embodiments, the imaging sensor controller 125, computing entity 130, and/or client device 140 are in communication with one another via one or more wired and/or wireless networks 150. In various embodiments, the one or more wired and/or wireless networks 150 may comprise Wi-Fi, a local area network (LAN), wireless LAN (WLAN), the Internet, and/or other appropriate digital communication channel.

Example Imaging Sensor Controller

FIG. 2 provides a schematic of an imaging sensor controller 125 according to one embodiment of the present invention. In various embodiments, the one or more imaging sensors 120 are digital cameras, high definition digital cameras, optical cameras, infrared cameras, ultraviolet cameras, radar, lidars, and/or other sensors configured to capture image data of an at least partially fabricated product 5. In various embodiments, the imaging sensors 120 are configured to capture imaging data of the at least partially fabricated product 5 from one or more angles and/or perspectives under one or more lighting conditions (e.g., low light, bright light, infrared light, red light, white light, blue light, ultraviolet light, dark field, light field, and/or the like).

In various embodiments, the imaging sensor controller 125 is configured to control the operation of the one or more imaging sensors 120. For example, the imaging sensor controller 125 may be configured to cause the one or more imaging sensors 120 to capture imaging data, control the lighting conditions under which the imaging data is captured, and/or the like. In various embodiments, the imaging sensor controller 125 is configured to receive the imaging data captured by the imaging sensors. In an example embodiment, the imaging sensor controller 125 converts the imaging data into images (e.g., via A/D converter 225 and/or the like) and provides the images to the computing entity 130. In an example embodiment, the imaging sensor controller 125 provides the imaging data (e.g., in addition to or instead of the images) to the computing entity 130.

In general, the terms controller, computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, relays, routers, network access points, base stations, controller devices, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar actions, which terms are used herein interchangeably. In one embodiment, these functions, operations, and/or processes can be performed on data, content, information, and/or the like, and such terms are used herein interchangeably.

As indicated, in one embodiment, the imaging sensor controller 125 may also include one or more network interfaces 220 and/or other communication interfaces for communicating with various computing entities, such as by communicating data, content, information, control signals, etc. that can be transmitted, received, operated on, processed, displayed, stored, and/or the like.

As shown in FIG. 2, in one embodiment, the imaging sensor controller 125 may include or be in communication with one or more processing elements 205 (also referred to as processors, processing circuitry, and/or the like) that communicate with other elements within the imaging sensor controller 125 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the imaging sensor controller 125 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like. For example, the non-volatile storage or memory media 210 may store executable instructions configured to control operation of the one or more imaging sensors 120 (e.g., to capture image data of the at least partially fabricated products 5), control the lighting conditions under which the imaging sensors 120 capture image data of the at least partially fabricated products 5, transform and/or convert the imaging data to images, provide the imaging data and/or images such that the computing entity 130 receives the imaging data and/or images, and/or the like. For example, the non-volatile storage or memory media 210 may be configured to store the imaging data captured and provided by the imaging sensors 120.

In one embodiment, the imaging sensor controller 125 may further include or be in communication with volatile media (also referred to as volatile storage, memory, memory storage, memory circuitry and/or the like). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the imaging sensor controller 125 with the assistance of the processing element 205 and operating system.

As indicated, in one embodiment, the imaging sensor controller 125 may also include one or more network interfaces 220 and/or other communication interfaces for communicating with various computing entities, such as by communicating data, content, information, etc. that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the imaging sensor controller 125 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the imaging sensor controller 125 may include or be in communication with one or more input elements, such as buttons, a keyboard input, a mouse input, a touch screen/display input, motion input, movement input, audio input, pointing device input, joystick input, keypad input, and/or the like. The imaging sensor controller 125 may also include or be in communication with one or more output elements (not shown), such as audio output, video output, screen/display output, motion output, movement output, and/or the like.

In various embodiments, the imaging sensor controller 125 further comprises one or more analog-to-digital (A/D) converters 225. In various embodiments, one or more A/D converters 225 are configured to generate and provide control signals configured to control the one or more imaging sensors 120 and/or lighting devices (not shown) to control the lighting conditions under which the imaging sensors 120 capture images of an at least partially fabricated product 5. In various embodiments, one or more A/D converters 225 are configured to receive imaging data captured by the imaging sensors 120, convert the imaging data into one or more images, provide the imaging data and/or one or more images to the processing element 205 and/or memory 210, 215, and/or the like.

Example Computing Entity

In various embodiments, the computing entity 130 is configured to receive imaging data and/or one or more images and corresponding meta data, receive functional test results, execute a product inspection engine, identify training images and automatically associate labeling data with the training images based on the inspection results, perform various actions corresponding to the further fabrication and/or packaging of an at least partially fabricated product based on the results of the inspection results, and/or the like. In various embodiments, the computing entity 130 is and/or is part of a server, network of servers, computer, Cloud-based computing resource, and/or the like. FIG. 3 illustrates a schematic of an imaging sensor controller 125 according to one embodiment of the present invention.

In general, the terms controller, computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, relays, routers, network access points, base stations, controller devices, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar actions, and such terms are used herein interchangeably. In one embodiment, these functions, operations, and/or processes can be performed on data, content, information, and/or the like.

As indicated, in one embodiment, the computing entity 130 may also include one or more network interfaces 320 and/or other communication interfaces for communicating with various computing entities, such as by communicating data, content, information, control signals, and/or similar terms used herein interchangeably that can be transmitted, received, operated on, processed, displayed, stored, and/or the like.

As shown in FIG. 3, in one embodiment, the computing entity 130 may include or be in communication with one or more processing elements 305 (also referred to as processors, processing circuitry, and/or similar terms used herein interchangeably) that communicate with other elements within the computing entity 130 via a bus, for example. As will be understood, the processing element 305 may be embodied in a number of different ways.

For example, the processing element 305 may be embodied as one or more CPLDs, microprocessors, multi-core processors, coprocessing entities, ASIPs, microcontrollers, and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, ASICs, FPGAs, PLAs, hardware accelerators, other circuitry, and/or the like.

As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the computing entity 130 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

For example, the non-volatile storage or memory media 310 may store executable instructions configured to cause receipt of imaging data and/or one or more images, execute a product inspection engine 350 and/or a product inspection model 355 of the product inspection engine, provide inspection results, identify training images from an image database 360 and automatically cause association of labeling data with the training images, performance of one or more actions based at least in part on the inspection results, execute a root cause engine 370, provide information regarding a common feature determined by the root cause engine, and/or the like.

In one embodiment, the computing entity 130 may further include or be in communication with volatile media (also referred to as volatile storage, memory, memory storage, memory circuitry and/or similar terms used herein interchangeably). In one embodiment, the volatile storage or memory may also include one or more volatile storage or memory media 315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305. Thus, the databases, database instances, database management systems, data, applications, programs, program modules, scripts, source code, object code, byte code, compiled code, interpreted code, machine code, executable instructions, and/or the like may be used to control certain aspects of the operation of the computing entity 130 with the assistance of the processing element 305 and operating system.

As indicated, in one embodiment, the computing entity 130 may also include one or more network interfaces 320 and/or other communication interfaces for communicating with various computing entities, such as by communicating data, content, information, etc. that can be transmitted, received, operated on, processed, displayed, stored, and/or the like. Such communication may be executed using a wired data transmission protocol, such as FDDI, DSL, Ethernet, ATM, frame relay, DOCSIS, or any other wired transmission protocol. Similarly, the computing entity 130 may be configured to communicate via wireless external communication networks using any of a variety of protocols, such as GPRS, UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

Although not shown, the computing entity 130 may include or be in communication with one or more input elements, such as buttons, a keyboard input, a mouse input, a touch screen/display input, motion input, movement input, audio input, pointing device input, joystick input, keypad input, and/or the like. The computing entity 130 may also include or be in communication with one or more output elements (not shown), such as audio output, video output, screen/display output, motion output, movement output, and/or the like.

In an example embodiment, the image sensor controller 125 is a component of and/or incorporated into the computing entity 130.

Example Client Device

FIG. 4 provides an illustrative schematic representative of a client device 140 that can be used in conjunction with embodiments of the present invention. In various embodiments, the client device 140 is intended for user interaction therewith. For example, the client device 140 may be configured to display and/or audibly provide an indication of inspection results, common features determined by a root cause engine, a training image and/or the like. In an example embodiment, the client device 140 is configured to receive user input indicating human annotation data to be associated with a training image.

In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 4, the client device 140 can include an antenna 412, a transmitter 404 (e.g., radio), a receiver 406 (e.g., radio), and a processing element 408 (e.g., CPLDs, microprocessors, multi-core processors, coprocessing entities, ASIPs, microcontrollers, and/or controllers) that provides signals to and receives signals from the transmitter 404 and receiver 406, respectively.

The signals provided to and received from the transmitter 404 and the receiver 406, respectively, may include signaling information/data in accordance with air interface standards of applicable wireless systems. In this regard, the client device 140 may be capable of operating with one or more air interface standards, communication protocols, modulation types, and access types. More particularly, the client device 140 may operate in accordance with any of a number of wireless communication standards and protocols, such as those described above with regard to the computing entity 130. In a particular embodiment, the client device 140 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client device 140 may operate in accordance with multiple wired communication standards and protocols, such as those described above with regard to the computing entity 130 via a network interface 420.

Via these communication standards and protocols, the client device 140 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client device 140 can also download changes, add-ons, and updates, for instance, to its firmware, software (e.g., including executable instructions, applications, program modules), and operating system.

The client device 140 may also comprise a user interface (that can include a display 416 coupled to a processing element 308) and/or a user input interface (coupled to a processing element 408). For example, the user interface may be a user application, browser, user interface, and/or similar words used herein interchangeably executing on and/or accessible via the client device 140 to interact with and/or cause display of inspection results, common features identified by the root cause engine, training images and associated labeling data, and/or the like, as described herein. The user input interface can comprise any of a number of devices or interfaces allowing the client device 140 to receive data, such as a keypad 418 (hard or soft), a touch display, voice/speech or motion interfaces, or other input device. In embodiments including a keypad 418, the keypad 418 can include (or cause display of) the conventional numeric (0-9) and related keys (#, *), and other keys used for operating the client device 140 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client device 140 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client device 140. As indicated, this may include a user application that is resident on the entity or accessible through a browser or other user interface for communicating with the computing entity 130 and/or various other computing entities.

In another embodiment, the client device 140 may include one or more components or functionality that are the same or similar to those of the computing entity 130, as described in greater detail above. As will be recognized, these architectures and descriptions are provided for exemplary purposes only and are not limiting to the various embodiments.

In various embodiments, the client device 140 may be embodied as an artificial intelligence (AI) computing entity or smart device, some examples of which include an Amazon Echo® device, Amazon Echo Dot® device, Amazon Show™ device, Google Home® device, and/or the like. Accordingly, the client device 140 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. EXEMPLARY SYSTEM OPERATIONS

Various embodiments provide methods, apparatus, systems, computing devices, computing entities, and/or the like for actively training a product inspection engine configured to process inspection images and provide an inspection result based thereon. In various embodiments, the product inspection engine comprises a machine learning-trained product inspection model configured to perform an automated visual inspection of an at least partially fabricated product and provide an output based thereon. In various embodiments, the active training of the product inspection engine comprises identifying and associating labeling data with new training images based on results of processing inspection images corresponding to the at least partially fabricated product in an automated manner. Various embodiments are configured to control the routing of the at least partially fabricated product through the fabrication facility, determine a root cause of products identified as likely faulty, identify fabrication components that may require maintenance and/or repair, and/or the like.

Example Use and Active Training of a Product Inspection Engine

FIG. 5 provides a flowchart illustrating an overview of various processes, operations, procedures, and/or the like that are performed in accordance with an example embodiment to actively train a product inspection engine comprising a machine learning-trained product inspection model. Starting at step/operation 502, an at least partially fabricated product 5 is fabricated. For example, one or more fabrication components 110 may be used to at least partially fabricate a product. For example, the product may be a mechanical device, electrical device, computing device, a component thereof, and/or the like. In an example embodiment, the product is a computing chip and/or circuit board. In various embodiments, the product is a circuit board configured to comprise and/or be part of an electrical circuit, electro-optical circuit, photonic circuit, and/or the like. For example, in an example embodiment, the product is a circuit board configured to be a component of a computing device and/or an electro-optical device. For example, the product can be and/or can be a component of a central processing unit (CPU), a graphics processing unit (GPU), switch, network adapter, data processing unit (DPU), and/or other processer element and/or computing chip.

At step/operation 504, the at least partially fabricated product 5 is tested and/or analyzed. For example, a functional test or electrical test may be performed on the at least partially fabricated product 5 to determine functional test results corresponding to the at least partially fabricated product 5. In various embodiments, imaging data corresponding to one or more images of the at least partially fabricated product 5 are captured. The imaging data and/or one or more images may be captured under one or more lighting conditions, from one or more angles and/or perspectives, and/or the like. The imaging data and/or images and any determined functional test results may be provided to the computing entity 130.

The computing entity 130 may then execute and/or cause execution of a product inspection engine. The product inspection engine may comprise a machine learning-trained product inspection model configured to process and/or analyze images (e.g., inspection images) and/or segments of images (e.g., three, two, or one dimensional portions of inspection images) of the at least partially fabricated product 5 and determine whether the resulting product (e.g., formed by finishing the fabrication of the at least partially fabricated product) is likely to fail, the likelihood that the resulting product is likely to fail, a particular portion of the at least partially fabricated product that is likely to cause the resulting product to fail, the likelihood that a particular portion of the at least partially fabricated product is likely to cause the resulting product to fail, and/or the like.

For example, the product inspection engine may receive one or more inspection images and possibly the functional results generated as the output of one or more functional tests and/or electrical tests corresponding to the at least partially fabricated product. The product inspection engine may then prepare and/or pre-processes the one or more inspection images. For example, the product inspection engine may divide one or more inspection images into segments (e.g., three, two, or one-dimensional portions), align various ones of the one or more inspection images, normalize one or more inspection images, adjust the brightness and/or scaling and/or color distribution of one or more inspection images, and/or the like. The prepared and/or pre-processed inspection images (and/or segments thereof) and possibly the functional test results may be provided as input to the machine learning-trained product inspection model. The product inspection model may transform the input provided thereto in accordance with the weights and/or parameters and the architecture of the product inspection model to generate an output. The output of the product inspection model may be processed by the product inspection engine to generate and/or determine an inspection result. In an example embodiment, the product inspection engine may aggregate the output of the product inspection model for multiple inspection images and/or a plurality of segments of one or more inspection images to generate and/or determine the inspection result. The computing entity 130 (e.g., the processing element 305, memory 310, 315, and/or an application/programming operating thereon) may receive inspection results and trigger appropriate actions based thereon.

In an example embodiment, a functional test and/or electrical test is performed after the inspection results are determined. For example, in an example embodiment, the performance of functional test and/or electrical test is triggered when the inspection results satisfy certain criteria and performance of the functional test and/or electrical test is not triggered when the inspection results do not satisfy the certain criteria. For example, when the inspection results indicate a high confidence (e.g., a confidence level that is greater than a confidence threshold) that the at least partially fabricated product 5 is likely to fail and/or not likely to fail, performance of the functional test and/or electrical test is not triggered, in an example embodiment. And when the inspection results indicate a low or moderate confidence (e.g., a confidence level that is not greater than the confidence threshold) that the at least partially fabricated product 5 is likely to fail and/or not likely to fail, performance of the functional test and/or electrical test is triggered, in the example embodiment.

At step/operation 506, new training data is generated. In various embodiments, the computing entity 130 stores (e.g., in memory 310, 315) and/or otherwise has access to an image database. The image database may include various images of at least partially fabricated products 5. For example, the image database may store images and/or imaging data captured by the imaging sensors 120, in various embodiments.

In various embodiments, the new training data is generated by the computing entity 130 identifying images stored in the image database that are similar to one or more of the inspection images that were processed by the product inspection engine to generate the inspection results. For example, in an example embodiment, the inspection results may indicate that a portion of an image of the at least partially fabricated product has a reflectivity that is higher or lower than an expected reflectivity. This higher or lower reflectivity may be determined to have a significant influence on the determination of whether the at least partially fabricated product 5 is likely to fail. Images in the image database that include portions that are similar to the portion of the image (e.g., include similar product elements and/or the like) and that also exhibit a similarly higher or lower reflectivity (e.g., compared to an expected reflectivity) may be identified as training images that are similar to one or more of the images of the at least partially fabricated product 5.

In various embodiments, the new training data is further generated by the computing entity 130 by automatically associating respective labeling data with the training images. For example, when it is determined that the at least partially fabricated product 5 is likely to fail, the identified training images may be automatically associated with labeling data indicating that the respective at least partially fabricated products 5 illustrated in training images are likely to fail. When it is determined that the at least partially fabricated product 5 is not likely to fail, the identified training images may be automatically associated with labeling data indicating that the respect at least partially fabricated products 5 illustrated in training images are not likely to fail.

In an example embodiment, the automatically generated labeling data is augmented by human annotation data. For example, the computing entity 130 may cause a client device 140 to display a training image and the automatically associated labeling data via a display of the client device 140. The client device 140 may receive user input providing human annotation data provided via a user interface thereof (e.g., by a human user that is a trained inspector). The human annotation data may be extracted from the user input and added to the automatically associated labeling data. For example, the human annotation data may be associated with the respective training image.

At step/operation 508, the product inspection engine is further trained based at least in part on the new training data. For example, the computing entity 130 may cause the product inspection engine to be further trained based at least in part on the new training data. For example, periodically and/or in a triggered manner, the computing entity 130 may execute and/or cause execution of a training algorithm configured to cause the further training of the product inspection engine based at least in part on the new training data. For example, the new training data may be added to a training data repository and training data may be selected (e.g., randomly and/or in a weighted manner) for use in training and testing the product inspection engine. Thus, the product inspection engine may be trained in an active manner based at least in part on the automated generation of new training data. The product inspection engine may therefore continue to become more accurate and/or learn to inspect products that are re-designs of previous products and/or new products.

In various embodiments, the active training of the product inspection engine includes re-training and/or further training of the product inspection model of the product inspection engine. In an example embodiment, the active training of the product inspection engine includes further training of how to interpret and/or aggregate the output of the product inspection model to provide a more accurate prediction of whether the resulting product (e.g., formed by finishing the fabrication of the at least partially fabricated product) is likely to fail, the likelihood that the resulting product is likely to fail, a particular portion of the at least partially fabricated product that is likely to cause the resulting product to fail, the likelihood that a particular portion of the at least partially fabricated product is likely to cause the resulting product to fail, and/or the like.

FIG. 6 provides a flowchart illustrating processes, procedures, operations, and/or the like performed by the computing entity 130 to actively train the product inspection engine, according to an example embodiment. Starting at step/operation 602, the computing entity 130 obtains functional test results for the at least partially fabricated product 5, in an example embodiment. For example, one or more functional tests may be performed on the at least partially fabricated product to determine and/or generate respective functional test results which are received and/or accessed from memory by the computing entity 130. For example, in an example embodiment, the computing entity 130 may control one or more testing platforms configured to perform one or more functional tests on the at least partially fabricated product. In another example embodiment, the computing entity 130 is in communication (e.g., via one or more networks 150) with one or more testing platforms configured to perform one or more functional tests on the at least partially fabricated product. In still another example embodiment, the computing entity 130 provides a graphical user interface (GUI) through the user interface of the computing entity 130 and/or the user interface of a client device 140 and the GUI is configured to receive user input providing one or more functional test results corresponding to an at least partially fabricated product. For example, the computing entity 130 may comprise means, such as processing element 305, memory 310, 315, network interface 320, and/or the like, for receiving one or more functional test results corresponding to an at least partially fabricated product. In various embodiments, the obtained functional test results are associated with a product identifier configured to uniquely identify the corresponding at least partially fabricated product globally, within a batch or fabrication lot, and/or the like.

In various embodiments, the functional test performed to generate and/or determine the functional test results is a test configured to provide an indication of whether the at least partially fabricated product is expected to result in a functional product. For example, the functional test may be a mechanical test (e.g., stress test, impact testing, tension testing, and/or the like). For example, the functional test may be an electrical test (e.g., testing that an at least partially fabricated circuit conducts electricity in an expected manner, and/or the like). In various embodiments, the functional test(s) performed are appropriate for the product being fabricated.

In various embodiments, when functional test results are received, they are held in active memory (e.g., volatile memory 315, cache, and/or the like) in association with a respective product identifier. For example, in such an embodiment, the functional test results may be provided to the product inspection engine (e.g., as part of an application program interface (API) call).

In various embodiments, when functional test results are received they are stored in a database (e.g., in memory 310) in association with a respective product identifier. For example, in such an embodiment, the product inspection engine may be configured to access the functional test result by submitting a request (e.g., via an API call) to a database managing program and/or application.

At step/operation 604, the computing entity 130 obtains one or more inspection images of the at least partially fabricated product. For example, the imaging sensor controller 125 may provide (e.g., transmit) the one or more inspection images of the at least partially fabricated product and the computing entity 130 may receive the one or more inspection images. In an example embodiment, the imaging sensor controller 125 provides the one or more inspection images to an image database 360 stored by and/or otherwise accessible to the computing entity 130. For example, the computing entity 130 may access the one or more inspection images from the image database. For example, the computing entity 130 may comprise means, such as processing element 305, memory 310, 315, network interface 320, and/or the like, for obtaining the one or more inspection images.

In various embodiments, the one or more inspection images comprise a plurality of inspection images that were captured from one or more respective angles and/or distances, under one or more respective lighting conditions (e.g., low light, bright light, infrared light, red light, white light, blue light, ultraviolet light, dark field, light field, and/or the like), one or more respective resolutions, and/or the like.

In various embodiments, the one or more inspection images are associated with respective product identifiers. In various embodiments, the one or more inspection images are associated with meta data that indicates which fabrication components 110, human technicians, raw materials, prefabricated elements, and/or the like were used to fabricate the at least partially fabricated product. In an example embodiment, respective meta data is linked to one or more inspection images via the respective product identifier.

At step/operation 606, the computing entity 130 provides the one or more inspection images, and possibly functional test results, to the product inspection engine. For example, the computing entity 130 comprises means, such as processing element 305, memory 310, 315, and/or the like for providing the one or more inspection images, and possibly functional test results, to the product inspection engine. In various embodiments, the one or more inspection images, and, if available, functional test results, are provided to the product inspection engine via an API call.

Providing the one or more inspection images to the product inspection engine may trigger the product inspection engine to process the inspection image(s), possibly in association with corresponding functional test results. For example, the computing entity 130 may execute executable instructions configured to cause the product inspection engine to process the inspection image(s), possibly in association with corresponding functional test results. For example, in an example embodiment, the product inspection engine receives one or more inspection images and possibly the functional test results corresponding to the at least partially fabricated product, prepares and/or pre-processes the one or more inspection images, and provides the prepared and/or pre-processed inspection images (and/or segments thereof) and possibly the functional test results, as input to the machine learning-trained product inspection model of the product inspection engine. The product inspection model transforms the input provided thereto in accordance with the weights and/or parameters and the architecture of the product inspection model to generate an output. The product inspection engine processes and/or aggregates the output of the product inspection model to generate and/or determine an inspection result corresponding to the at least partially fabricated product.

In various embodiments, the product inspection model is and/or comprises a classifier, such as a residual network (ResNet) model, a convolution neural network (CNN) such as a MobileNet model, and/or the like. In various embodiments, the product inspection model is configured to perform semantic segmentation. For example, the product inspection model is and/or comprises a CNN such as a DeepLab model, U-net model, and/or the like. In various embodiments, the product inspection model has a Siamese network architecture. For example, a Siamese network architecture may enable the product inspection model itself to determine whether two examples are of the same class and/or error type or not without requiring manual/human input. Various neural network architectures may be used in various embodiments, as appropriate for the application.

At step/operation 608, the computing entity 130 receives the inspection result for the at least partially fabricated product. For example, the product inspection engine may return the inspection result as an API response and/or return call, in an example embodiment. For example, the computing entity 130 may comprise means, such as processing element 305, memory 310, 315, and/or the like, for receiving the inspection result. In various embodiments, the inspection result indicates whether the resulting product (e.g., formed by finishing the fabrication of the at least partially fabricated product) is likely to fail, the likelihood that the resulting product is likely to fail, a particular portion of the at least partially fabricated product that is likely to cause the resulting product to fail, the likelihood that a particular portion of the at least partially fabricated product is likely to cause the resulting product to fail, a class identified for the at least partially fabricated product (e.g., a classification or error code of why the at least partially fabricated product was determined to be likely to fail), and/or the like. In various embodiments, the class identified for the at least partially fabricated product indicates whether the resulting product is likely to fail, possibly a confidence level of the determination of whether the resulting product is likely to fail, a reason why the resulting product is likely to fail or not likely to fail, a characterization of one or more visual aspects of the at least partially fabricated product (e.g., a number or range of numbers of identifiable scratches and/or imperfections on the surface of the at least partially fabricated product, locations of the identifiable scratches and/or imperfections on the surface of the at least partially fabricated product, one or more identified potential issues for the at least partially fabricated product (e.g., areas of lower than expected reflectivity, areas of higher than expected reflectivity, and/or the like)).

At step/operation 610, the computing entity 130 provides and/or stores an indication of the inspection result. For example, the computing entity 130 may store an indication of the inspection result in association with meta data associated with the respective product identifier and/or the one or more inspection images in the image database or another database. In an example embodiment, the computing entity 130 provides (e.g., transmits) an indication of the inspection result such that a client device 140 receives the indication and provides (e.g., displays) information corresponding to the inspection result via display 416 or audibly provides the information corresponding to the inspection result. For example, the computing entity 130 may cause the client device 140 to provide information corresponding to the inspection result in a human perceivable manner. For example, the computing entity 130 may cause the client device 140 to display and/or cause the storage (e.g., in memory 310, 315) of information identifying a particular portion of the at least partially fabricated product that is likely to cause the resulting product to fail, a class identified for the at least partially fabricated product, and/or the like, possibly in addition to the determination and/or confidence level of the determination of whether the resulting product is likely to fail.

In an example embodiment, the computing entity 130 may control the routing of the at least partially fabricated product through at least a portion of the fabrication facility based at least in part on the inspection result. The computing entity 130 may provide the inspection results, possibly in association with the inspection image(s) and/or corresponding meta data, to a root cause engine, and/or the like.

At step/operation 612, the computing entity 130 identifies, selects, and/or determines one or more new training images from the image database 360. For example, the computing entity 130 may comprise means, such as processing element 305, memory 310, 315, and/or the like for identifying, selecting, and/or determining one or more new training images from an image database.

For example, the image database may include images captured of a plurality of at least partially fabricated products. In various embodiments, the new training image is identified, selected, and/or determined based on the new training images being similar to at least one of the one or more inspection images and/or a segment of a new training image being similar to a segment of one of the one or more inspection images. For example, a reverse image search that uses at least one of the one or more inspection images and/or at least one segment of one of the one or more inspection images may be used as the basis for a query to search the image database 360 and identify, select, and/or determine new training images from the plurality of images stored in the image database. For example, in an example embodiment in which the product inspection engine considers one or more tiles or segments of an inspection image at a time, training images may be identified, selected, and/or determined from the plurality of images stored in the image database based on one or more of the tiles or segments of the inspection image. In various embodiments, the at least one of the one or more inspection images and/or at least one segment of the one or more inspection images used to generate the query were identified (e.g., by the product inspection engine) as indicating the resulting product was likely to fail or likely to not fail. In an example embodiment, the at least one segment used to generate the query corresponds to a portion of the at least partially fabricated product that was determined (e.g., by the product inspection image) as a portion of the at least partially fabricated product that was likely to cause the resulting product to fail.

For example, in an example embodiment, the at least partially fabricated product is at least a partially fabricated circuit board, photonic circuit, and/or electro-optical circuit. The inspection results may indicate that a portion of a corresponding inspection image has a reflectivity that is higher or lower than an expected reflectivity. This higher or lower reflectivity may be determined to have a significant influence on the determination of whether the at least partially fabricated product 5 is likely to fail. For example, the higher or lower reflectivity of the portion of the image may indicate that a component was secured to a circuit board with too little or too much solder, which may result in a product failure. Images in the image database that include portions that are similar to the portion of the image (e.g., include similar product elements and/or the like) and that also exhibit a similarly higher or lower reflectivity (e.g., compared to an expected reflectivity) may be identified as training images that are similar to one or more of the inspection images corresponding to the at least partially fabricated product 5.

In an example embodiment, the number of new training images identified, selected, and/or determined is based at least in part on the confidence level associated with the inspection result. For example, the inspection result may indicate that the resulting product is likely to fail with a high likelihood or that there is a high level of confidence that the resulting product will fail. In such an instance, more new training images are identified, selected, and/or determined than when the inspection result indicates that the resulting product is likely to fail with a moderate likelihood or that there is a moderate or low level of confidence that the resulting product will fail, in an example embodiment. In an example embodiment, when it is determined that there is a high likelihood that the resulting product will fail or that the determination that the resulting product is likely to fail is associated with a high confidence level, more new training images are identified, selected, and/or determined than when the inspection result indicates that there is a high likelihood that the resulting product is not likely to fail or that there is a high level of confidence that the resulting product will not fail. In various embodiments, the number of new training images identified, selected, and/or determined is determined as least in part based on the number of similar images present in the image database.

At step/operation 614, the computing entity 130 automatically associates labeling data with the new training image(s). For example, the computing entity 130 may comprise means, such as processing element 305, memory 310, 315, and/or the like, for automatically associating labeling data with the new training image(s).

For example, when the inspection result indicates that the resulting product is likely to fail, the new training images identified, selected, and/or determined are associated with labeling data indicating that the respective resulting products are likely to fail. In another example, when the inspection result indicates that the resulting product is not likely to fail, the new training images identified, selected, and/or determined are associated with labeling data indicating that the respective resulting product is not likely to fail. In an example embodiment, the new training images identified, selected, and/or determined are associated with labeling data that indicates a likelihood that the resulting product failure as indicated by the inspection result and/or a confidence level for the determination of whether or not the resulting product is likely to fail as indicated by the inspection result.

In an example embodiment, the labeling data may include information included and/or determined based at least in part on the inspection result. For example, the labeling data may identify a particular portion of the at least partially fabricated product that is likely to cause the resulting product to fail, a class identified for the at least partially fabricated product, and/or the like, possibly in addition to the determination and/or confidence level of the determination of whether the resulting product is likely to fail.

In particular, the new training images are associated with labeling data determined based at least in part on the inspection result corresponding to the inspection images used to identify, select, and/or determine the new training images. Thus, the training data for the product inspection model may be developed, grown, expanded, and/or generated without human intervention, in various embodiments.

In an example embodiment, a semi-supervised labeling model (which may be part of the product inspection engine) is used to generate automatically generated labeling data that includes automatically generated annotation data. In an example embodiment, the automatically generated labeling data comprises one or more pseudo-labels. In an example embodiment, the automatically generated labeling data generated by the labeling model approximates the detail, structure, content, and/or the like of human annotation data. For example, the labeling model may be trained (e.g., in a semi-supervised manner) to automatically generate annotation data for a training image and/or a segment of a training data that approximates the human annotation data that a trained human inspector would provide for the training image and/or the segment of the training image. In an example embodiment, the automatically generated labelling data associated with some or all of the training images may be and/or include automatically generated annotation data (e.g., generated by the labeling model).

In an example embodiment, at step/operation 616, the computing entity 130 obtains human annotation data for a new training image and associates the human annotation data with the new training image. For example, the computing entity 130 comprises means, such as processing element 305, memory 310, 315, network interface 320, and/or the like, for obtaining human annotation data for a new training image and associating the human annotation data with the new training image. For example, the human annotation data augments and/or is added to the automatically generated labeling data, in various embodiments.

In an example embodiment, human annotation data is obtained for at least one new training image. In an example embodiment, human annotation data is obtained for a particular number and/or percentage of new training images (e.g., half of the new training images, and/or the like). In an example embodiment, human annotation data is obtained for each new training image. In an example embodiment, the new training images are organized into groups of one or more training images that each correspond to the same respective at least partially fabricated product. In such an embodiment, the labeling data and/or human annotation data is associated with a respective group of one or more training images and/or particular segments of the one or more training images, as appropriate.

In various embodiments, the human annotation data is obtained by causing a new training image or a group of new training images and the labeling data automatically associated therewith to be displayed via a GUI provided by a display 416 of a client device 140. The user interface of the client device 140 receives user input indicating the human annotation data. The client device 140 provides the human annotation data such that the computing entity 130 receives the human annotation data and associates it with the respective new training image and/or group of training images.

At step/operation 618, the computing entity 130 causes the product inspection engine to be further trained based on the new training data. For example, the computing entity 130 comprises means, such as processing element 305, memory 310, 315, and/or the like, for causing the product inspection engine to be further trained based at least in part on the new training data. The new training data includes the new training image(s) and/or group(s) of new training images and the associated labeling data (possibly including human annotation data).

For example, in an example embodiment, the new training data is added to a training data repository and/or database. The further training of the product inspection engine may be triggered periodically (e.g., each evening, each weekend, and/or the like), responsive to a particular amount of new training data having been added to the training data repository and/or database since the product inspection engine was last trained, and/or the like. Training data may be selected randomly, in a weighted manner, and/or in a newest training data first manner to further train the product inspection engine. In various embodiments, a variety of machine learning algorithms may be used to further train the product inspection engine and/or product inspection model thereof. In various embodiments, the product inspection engine and/or product inspection model thereof may be further trained using a loss function. In various embodiments, the loss function is a binary class entropy loss function, a focal loss function, a dice loss function, and/or the like.

As should be understood, the product inspection engine is configured to process inspection images corresponding to a plurality of at least partially fabricated products and provide respective inspection results. New training data (e.g., new training images and the associated labeling data) may be generated and/or determined in an at least partially automated manner (e.g., without human intervention other than the possible inclusion of human annotation data) for any number of the plurality of at least partially fabricated products based at least in part on the respective inspection results.

The product inspection engine may then be actively trained by further training the product inspection engine using at least a portion of the new training data. Thus, the product inspection engine becomes more robust over time and is able to adapt to re-designs of products, new similar products, and/or the like. For example, when an original product was a circuit board, the new similar product is also a circuit board but may have a different layout, different function, and/or the like.

Example Operation of a Root Cause Engine

In various embodiments, a plurality of inspection images corresponding to respective ones of a plurality of at least partially fabricated products, their respective inspection results, and associated respective meta data are provided to a root cause engine. The root cause engine is and/or comprises a machine learning-trained model, in various embodiments, configured to identify common features between at least partially fabricated products that are determined to be likely to fail. The one or more identified common features are provided, in an example embodiment, such that maintenance, repairs, changes to fabrication practices, and/or the like, may be made as appropriate to increase the efficiency of fabricating products that are not likely to fail and/or that are likely not to fail.

FIG. 7 provides a flowchart illustrating various processes, procedures, operations, and/or the like, in accordance with an example embodiment, for the use of a root cause engine in a system comprising a product inspection engine. In various embodiments, the root cause engine is configured to identify common features of at least partially fabricated products that are expected to fail and/or determined to be likely to fail. In various embodiments, the root cause engine is configured to track and/or monitor how the identified common features, number of at least partially fabricated products associated with a particular class and/or error code and/or the like evolve with time. For example, the root cause engine may determine and/or be configured to identify when a new common feature, particular class, and/or error code begins to be identified for the at least partially fabricated products that are determined to be likely to fail, and/or a change in the number or fraction of at least partially fabricated products that are determined to be likely to fail that are associate with a particular common feature, particular class, and/or error code. Such a determination and/or identification may result in triggering maintenance and/or repair of one or more fabrication components 110, training of a technician, inspection of one or more raw materials used in the fabrication of the at least partially fabricated products, and/or the like to improve the quality of at least partially fabricated products being fabricated at the fabrication facility.

In various embodiments, the root cause engine may comprise a clustering model. For example, the root cause engine may comprise a model trained using a semi-supervised machine learning technique that is configured to perform clustering of at last partially fabricated products (e.g., based on respective inspection engines, respective functional test results, respective inspection results, and/or the like) to identify common features, particular classes, and/or error codes and/or to track the time evolution of a number or fraction of at least partially fabricated products associated with respective common features, particular classes, and/or error codes.

Starting at step/operation 702, a plurality of inspection results, the respective inspection images and/or groups of inspection images (e.g., with each group corresponding to a respective at least partially fabricated product of a plurality of at least partially fabricated products), and/or respective meta data associated with the respective inspection images and/or groups of inspection images are provided to a root cause engine. In various embodiments, the root cause engine is executed by the computing entity 130 (e.g., by executing root cause engine 370 instructions by processing element 305). In an example embodiment, the plurality of inspection results, the respective inspection images and/or groups of inspection images, and/or respective meta data associated with the respective inspection images and/or groups of inspection images are provided to a root cause engine via an API call.

In various embodiments, the root cause engine comprises a machine learning-trained model configured to determine one or more common features between at least some of the plurality of at least partially fabricated products that have similar inspection results. For example, the common feature may be the identification of a particular segment of inspection images that is identified as indicating that the resulting product corresponding to the respective at least partially fabricated product is likely to fail. In an example embodiment, the common feature may be that a significant fraction of the plurality of at least partially fabricated products that correspond to inspection results that indicate the likely failure of a respective resulting product were fabricated using a particular fabricating component 110.

In an example embodiment, the inspection results for at least partially fabricated products that are determined to be likely to fail may include respective classifications of the expected respective failures and/or respective error codes indicating why the respective at least partially fabricated products are expected to result in resulting products that are likely to fail. In various embodiments, the common features may be determined based at least in part on the classifications and/or error codes of the respective inspection results.

For example, a particular fabricating component 110 may be configured to solder circuit components onto a circuit board and a number of circuit boards that were processed (e.g., had soldering performed thereon) by the particular fabricating component have similar higher/lower reflectivity (compared to an expected reflectivity) at one or more points on the circuit board corresponding to solder points. The particular fabricating component and/or the higher/lower reflectivity may be identified as a common feature between the number of circuit boards.

Thus, the root cause engine processes the plurality of inspection results, the respective inspection images and/or groups of inspection images, and/or respective meta data associated with the respective inspection images and/or groups of inspection images and determines one or more common features of at subsets of the at least partially fabricated products associated with inspection results indicating likely failure of corresponding resulting products. The root cause engine may then generate cause results comprising indications of the common features, a characterizing of the relationship between the common feature(s) and the sample of at least partially fabricated products, statistics regarding the common features (e.g., 48% of at least partially fabricated products fabricated using the particular fabricating component 110 are expected to result in failing resulting products, the statistical distribution of solder points having higher/lower reflectivity, etc.), and/or the like.

In an example embodiment, the root cause engine is configured to cluster the plurality of inspection results, the respective inspection images and/or groups of inspection images, and/or respective meta data associated with the respective images and/or groups of inspection images based common features in the inspection images and/or meta data. For example, the root cause engine may be configured to perform an unsupervised clustering of inspection images and/or the associated meta data based on one or more common features thereof. The common feature of a cluster may be used to determine the root cause of errors and/or a likelihood of the corresponding resulting products to fail, in an example embodiment.

At step/operation 704, the computing entity 130 receives the cause result. For example, the root cause engine may provide the cause result, including an indication of the identified common feature(s), as an API response. At step/operation 706, the computing entity 130 provides and/or stores the cause result and/or an indication of the common feature(s). For example, the cause result and/or an indication of the common feature(s) may be stored to memory 310, 315. For example, a graphical representation of the cause result and/or an indication of the common feature(s) may be provided (e.g., transmitted) for display (e.g., via display 416) by a client device 140. In various embodiments, the common features and/or statistics corresponding thereto may be tracked to determine when a common feature and/or a particular fabrication issue is becoming more prevalent. In various embodiments, the common feature and/or the time evolution of a common feature (e.g., if a common feature is becoming more prevalent over a period of time) may be used to trigger maintenance, repair, and/or the like of a fabricating component, additional training of a human operator of a fabricating component, and/or the like. For example, in various embodiments, the information provided by the cause result may be used to address causes of imperfections and possible faults of the at least partially fabricated products. For example, the cause results may be harnessed to increase the efficiency of production of products that are not likely to fail and/or are likely not to fail, in various embodiments.

Example Routing of a Partially Fabricated Product Based on a Corresponding Inspection Result In various embodiments, an at least partially fabricated product may be routed through at least a portion of a fabricating facility based at least in part on the corresponding inspection result. FIG. 8 provides a flowchart illustrating various processes, procedures, and/or operations that may be performed by a computing entity 130, for example, to control the routing of an at least partially fabricated product based at least in part on the corresponding inspection result. In an example embodiment, the processes, procedures, operations, and/or the like of FIG. 8 may be performed as part of step/operation 610.

Starting at step/operation 802, the computing entity 130 determines a routing for the at least partially fabricated product based on the corresponding inspection result. For example, when the inspection result indicates that the resulting product for the at least partially fabricated product is not likely to fail and/or likely to not fail, the determined routing may be for the at least partially fabricated product to continue with fabrication and/or packaging. When the inspection result indicates, possibly with low confidence, that the resulting product for the at least partially fabricated product is likely to fail, the determined routing may be for the at least partially fabricated product to undergo further testing (e.g., functional testing) and/or inspection (e.g., by a human inspector) and/or the like. For example, the determined routing may indicate that the at least partially fabricated product should be sent to quality assessment and/or quality assurance personnel. In an example embodiment, when the inspection result indicates (e.g., with high confidence) that the resulting product for the at least partially fabricated product is likely to fail, the determined routing may be for the at least partially fabricated product to be disassembled, recycled, reworked, and/or the like. For example, the determined routing may indicate that the at least partially fabricated product should be sent to a disassembly or recycling center of the fabricating facility, sent to a reworking center of the fabricating facility, and/or the like, as appropriate for the details of the inspection results, the product, and the fabricating facility.

At step/operation 804, the computing entity 130 causes routing of the at least partially fabricated product in accordance with the determined routing. For example, the computing entity 130 may communicate with a conveyor belt or other product moving system controller to cause the at least partially fabricated product to be routed through at least a portion of the fabrication facility in accordance with the determined routing. In another example, the computing entity 130 may cause a display (e.g., display 416 of a client device 140) provide an indication and/or instructions as to how an at least partially fabricated product should be routed. As should be understood, the actions taken by the computing entity 130 to cause the routing of the at least partially fabricated product in accordance with the determined routing is based at least in part on the fabricating facility and/or the level of automation thereof.

Example Obtaining of Human Annotation Data

In various embodiments, the active training of the product inspection engine is performed using new training data is at least partially automatically generated (e.g., without the use of human input). For example, new training images are automatically identified and labeling data is automatically generated and associated with the new training images. In various embodiments, at least some of the new training images and the labeling data associated therewith are presented to trained human inspectors such that human annotation data corresponding thereto may be obtained. However, as the new training images are automatically identified and automatically associated with labeling data (e.g., indicating whether the resulting product is likely to fail, a likelihood that the resulting product will fail, and/or the like), the human inspector can provide a focused inspection and/or annotation of the new training images presented to them. In particular, the human inspector need not look through a large volume of images to identify images that may be used as training images and then annotate the identified images. Thus, various embodiments allow for the efficient generation of a sizeable volume of quality human annotated training data.

FIG. 9 provides a flowchart illustrating various processes, procedures, operations, and/or the like for obtaining human annotation data a for a new training image and/or new group of training images, in accordance with an example embodiment. Starting step/operation 902, the computing entity 130 causes at least one training image and the associated labeling data to be displayed via an annotation GUI via a display 416 of a client device 140. For example, the computing entity 130 provides (e.g., transmits) the at least one training image and the associated labeling data to the client device 140 such that the client device 140 receives the at least one training image and the associated labeling data. Processing of the at least one training image and the associated labeling data by the client device 140 causes the client device 140 to display the at least one training image and the associated labeling data via an annotation GUI using display 416. In an example embodiment, a training image and/or segment thereof is associated with automatically generated labeling data that is and/or includes automatically generated annotation data. In such an embodiment, the automatically generated annotation data may be displayed via the annotation GUI.

At step/operation 904, the computing entity 130 receives human annotation data. For example, a human inspector interacts with the annotation GUI via the user interface of the client device 140 (e.g., keyboard 418, a mouse, touchscreen, and/or other user input device). The client device 140 receives the user input and generates the human annotation data based thereon. The client device 140 then provides (e.g., transmits) the human annotation data such that the computing entity 130 receives the human annotation data. In an example embodiment where a training image and/or segment thereof is associated with automatically generated labeling data that is and/or includes automatically generated annotation data, the human annotation data may confirm, modify, and/or expand the automatically generated annotation data. The confirmation, modification, and/or expansion of the automatically generated annotation data may be used to further train the labeling model, in an example embodiment.

At step/operation 906, the computing entity 130 updates the labeling data associated with the at least one training image based on the human annotation data. For example, the human annotation data is added to the labeling data associated with the at least one training image, in an example embodiment. For example, the human annotation data is used to augment, expand, modify, and/or add detail to the automatically generated labeling data. The updated labeling data is then stored, in association with the at least one training image, as part of the new training data for use in further training of the product inspection engine. For example, the labeling data may associated with the at least one training image may be updated to include both automatically generated labelling data (possibly including automatically generated annotation data) and human annotation data.

Example Operation of a Product Inspection Engine

FIG. 10 provides a flowchart illustrating various processes, procedures, operations, and/or the like performed by a computing entity 130 during the execution of a product inspection engine. For example, the processes, procedures, operations, and/or the like of FIG. 10 may be performed between step/operation 606 and 608 of FIG. 6 and/or as part of step/operation 504 of FIG. 5.

At step/operation 1002, the product inspection engine (e.g., being executed by the processing element 305 of the computing entity 130) receives the one or more inspection images for a respective at least partially fabricated product. In an example embodiment, the product inspection engine receives the one or more inspection images via an API call. In an example embodiment, the product inspection engine receives the one or more inspection engines as an API response to an API call the product inspection engine provided to a database management application or program associated ith the image database 360. In various embodiments, the one or more inspection images comprises a plurality of inspection images with different inspection images of the plurality of inspection images captured from different angles and/or perspectives, under different lighting conditions, and/or the like.

At step/operation 1004, the product inspection engine (e.g., being executed by the processing element 305 of the computing entity 130) receives one or more functional test results for a respective at least partially fabricated product, in an example embodiment. For example, the functional test results may indicate whether the at least partially fabricated product passed or failed one or more functional tests (e.g., electrical tests, mechanical tests, and/or the like as appropriate for the product). In an example embodiment, the product inspection engine receives the one or more functional test results via an API call (possibly the same API call that provides the one or more inspection images). In an example embodiment, the product inspection engine receives the one or more inspection engines as an API response received in response to an API call the product inspection engine provided to an appropriate data store (e.g., a data store storing functional test results for at least partially fabricated products in association with respective product identifiers).

At step/operation 1006, the product inspection engine (e.g., being executed by the processing element 305 of the computing entity 130) pre-processes at least one of the one or more inspection images. For example, the product inspection engine may align various ones of the one or more inspection images, normalize one or more inspection images, adjust the brightness and/or scaling and/or color distribution of one or more inspection images, perform a max pixel function on one or more inspection images, perform one or more data balancing processes, and/or the like. In various embodiments, the pre-processing performed on an inspection image is dependent on an image type of the image (e.g., 3D image, 2D image, dark field image, light field image, IR image, visual light image, and/or the like).

In various embodiments, at step/operation 1006A, at least one of the one or more inspection images is divided into segments. For example, the product inspection engine defines a plurality of three-dimensional, two-dimensional, and/or one-dimensional segments based on an inspection image. In an example embodiment, the segments are a tiling of the corresponding inspection image. For example, the one or more inspection images comprises at least one high definition image which is segmented and/or divided into a plurality of segments which the product inspection model may process independently, in an example embodiment. In an example embodiment, the segmentation of the at least one of the one or more inspection images is performed based on a user-defined segmentation. For example, a user may indicate that inspection images for at least partially fabricated products of a particular product type should be segmented using a particular segmentation scheme. In an example embodiment, the segmentation of the at least one of the one or more inspection images is performed by a deep neural network configured and/or trained to perform image segmentation.

At step/operation 1008, the product inspection engine (e.g., being executed by the processing element 305 of the computing entity 130) causes the product inspection model to transform respective inspection images and/or segments thereof into respective image/segment outputs. For example, the product inspection engine may provide one or more inspection images and/or segments thereof, and possibly the functional test result as well, to the input layer of the product inspection model. In an example embodiment, the inspection images and/or segments of inspection images are provided individually to the input layer of the product inspection model (possibly with the functional test result). In an example embodiment, multiple inspection images and/or segments of one or more inspection images (e.g., possibly segments of different inspection images that correspond to the same portion of the at least partially fabricated product, segments of one or more inspection images that correspond to adjacent portions of the at least partially fabricated product, and/or the like) to the input layer of the product inspection model simultaneously (possibly with the functional test result).

The product inspection model transforms the received input based at least in part on the product inspection model parameters and architecture. For example, the product inspection model transforms the data received at the input layer (e.g., generally in the form of one or more pre-processed inspection images and/or segments thereof) via application of the product inspection model parameters as the data flows through the hidden layers of the product inspection model to the output layer of the product inspection model. The product inspection engine then receives the respective image/segment outputs from the output layer of the product inspection model.

At step/operation 1010, the product inspection engine processes and/or aggregates the respective image/segment outputs. For example, in an example embodiment, each respective image/segment output may indicate a likelihood that the resulting product will fail. These likelihoods are aggregated, possibly in a weighted manner where the respective weights are assigned based on image type and/or one or more segment characteristics, to determine an aggregated likelihood that the resulting product will fail. A confidence level for the determination of the likelihood that the resulting product will fail may also be determined. Based on the aggregated likelihood that the resulting product will fail and/or the confidence level thereof, the product inspection engine generates and/or determines the inspection result.

In another example, the product inspection engine may process the respective image/segment outputs to determine whether one or more of the respective image/segment outputs indicates a likely failure. When none of the respective image/segment outputs indicates a likely failure, the product inspection engine determines that the resulting product is not likely to fail and when one or more of the respective image/segment outputs indicates a likely failure, the product inspection engine determines that the resulting product is likely to fail.

In various embodiments, the product inspection engine may process and/or aggregate the respective image/segment outputs to determine a class for the at least partially fabricated product. In various embodiments, the class identified and/or determined for the at least partially fabricated product indicates whether the resulting product is likely to fail, possibly a confidence level of the determination of whether the resulting product is likely to fail, a reason why the resulting product is likely to fail or not likely to fail, a characterization of one or more visual aspects of the at least partially fabricated product (e.g., a number or range of numbers of identifiable scratches and/or imperfections on the surface of the at least partially fabricated product, locations of the identifiable scratches and/or imperfections on the surface of the at least partially fabricated product, one or more identified potential issues for the at least partially fabricated product (e.g., areas of lower than expected reflectivity, areas of higher than expected reflectivity, and/or the like)).

For example, based at least in part on the respective image/segment outputs, the product inspection engine may determine whether the resulting product (e.g., formed by finishing the fabrication of the at least partially fabricated product) is likely to fail, the likelihood that the resulting product is likely to fail, a particular portion of the at least partially fabricated product that is likely to cause the resulting product to fail, the likelihood that a particular portion of the at least partially fabricated product is likely to cause the resulting product to fail, a class identified for the at least partially fabricated product, and/or the like. The product inspection engine may then generate an inspection result that indicates the determination(s).

At step/operation 1012, the product inspection engine (e.g., being executed by the processing element 305 of the computing entity 130) returns the inspection result. For example, the product inspection engine may return the inspection result as an API response responding to an API call that triggered the determination of the inspection result.

V. TECHNICAL ADVANTAGES

Conventionally products are visually inspected by human inspectors. However, human sight presents limitations. Additionally intra-inspector and inter-inspector variability reduces the accuracy of human inspection of a large number of products. However, the identification and annotation of the training data required for trained a robust machine learning-trained model is a significant task that requires a large number of hours of work performed by highly trained human inspectors. Moreover, minor changes to the product, let alone re-designs of a new product or new products, conventionally require training a new model and thus require additional hours of work to identify and annotate training data for the re-designed or new product. Thus, technical challenges exist regarding the training of a robust model for use in performing visual inspections of products.

Various embodiments provide technical solutions to these technical challenges. For example, various embodiments automatically identify new training images and automatically associate labeling data with the new training images based at least in part on inspection images and the corresponding inspection results. For example, pseudo-labels may be automatically generated for at least some of the new training images to improve the quality of the training data and the accuracy and robustness of the product inspection engine and/or product inspection model. Thus, a large amount of training data can be efficiently generated. Additionally, at least some of the new training images and the associated labelling data may be presented to a user (e.g., a trained human inspector) who may provide user input providing human annotation data that may augment the automatically determined labelling data. the new training data and the associated labeling data (that may contain human annotated data) are used to actively train the product analysis model. Thus, the accuracy of the product analysis model improves over time and is robust against minor changes in the product, re-designs of the product, and/or new, similar products, in various embodiments. As such, various embodiments provide technical improvements to the field of product inspection and/or machine learning model training.

Furthermore, in various embodiments, the inspection images are segmented and/or tiled and one or more segments or tiles of inspection image(s) are considered by the product inspection model at a time. In various embodiments, the tiling and/or segmentation of the inspection images enables the product inspection model to be agnostic as to the size and shape of the at least partially fabricated products. Moreover, the tiling and/or segmentation of the inspection images allows for the efficient handling of larger inspection images (e.g., high definition, multi-channel, and/or other images comprising a large number of bytes (e.g., 10 Gb)) and the efficient parallelization of processing the inspection image (s). For example, the tiling and/or segmentation of the inspection images results in faster processing of the inspection images and enables multi-graphical processing unit (GPU) multi-node inferences to be determined and/or generated.

Additional technical advantages provided by various embodiments include enabling the automated routing of an at least partially fabricated product through at least a portion of a fabrication facility, identification of fabrication components requiring maintenance and/or repair, identification of human operators of fabrication components that require additional training, and classification of imperfections identified for at least partially fabricated products.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for inspecting a product, the method comprising:
    obtaining, by one or more processors, at least one inspection image of an at least partially fabricated product;
    causing, by the one or more processors, the at least one inspection image to be processed by a product inspection engine, wherein the product inspection engine comprises a machine learning-trained model;
    obtaining, by the one or more processors, an inspection result determined based on the processing of the at least one inspection image by the product inspection engine;
    identifying, by the one or more processors, one or more training images from a plurality of images stored in an image database based at least in part on the at least one inspection image;
    associating, by the one or more processors, automatically generated labeling data with the one or more training images based at least in part on the inspection result determined by the processing of the at least one inspection image; and
    causing, by the one or more processors, training of the product inspection engine using the one or more training images and labeling data associated with the one or more training images.

2. The method of claim 1, further comprising:
    receiving a functional test result corresponding to the at least partially fabricated product shown in the at least one inspection image; and
    causing the functional test result to be provided to the product inspection engine, wherein the product inspection engine is configured to process the at least one inspection image based at least in part on the functional test result.

3. The method of claim 1, wherein labeling data associated with a training image of the one or more training images comprises human annotation data generated based at least in part on user input and the automatically generated labeling data.

4. The method of claim 3, further comprising:
    causing the training image of the one or more training images and at least a portion of the automatically generated labeling data associated with the training image to be displayed via a display of a user interface; and
    receiving user input indicating the human annotation data.

5. The method of claim 1, wherein the product inspection engine is configured to divide the at least one inspection image into a plurality of image segments and process each image segment of the plurality of image segments individually, and wherein the inspection result is based at least in part on the processing of each image segment.

6. The method of claim 1, wherein a routing of the at least partially fabricated product within a fabrication facility is performed based at least in part on the inspection result.

7. The method of claim 1, wherein the at least one inspection image is associated with meta data indicating at least one of (a) one or more fabrication components or (b) one or more human technicians that were involved in fabricating the at least partially fabricated product.

8. The method of claim 7, wherein the meta data associated with the at least one inspection image is processed by a root cause engine when the result of processing the at least one inspection image with the product inspection engine indicates that a resulting product is likely to fail, wherein the root cause engine comprises a machine learning-trained model.

9. The method of claim 1, further comprising causing a root cause engine to process a plurality of inspection images that are associated with respective inspection results for respective at least partially fabricated products to determine one or more clusters of inspection images of the plurality of inspection images, wherein each cluster of the one or more clusters comprises inspection images of the plurality of inspection images having a common feature.

10. The method of claim 9, further comprising providing, via a user interface, information regarding the common feature.

11. The method of claim 1, wherein the at least partially fabricated product is at least a portion of a circuit board, a photonic circuit, an electro-optical device, central processing unit (CPU), graphics processing unit (GPU), switch, network adapter, data processing unit (DPU), processing element, or computing chip.

12. The method of claim 1, wherein the one or more training images are identified as (a) being substantially similar to the at least one inspection image or (b) having a first image segment that is substantially similar to a second image segment of the at least one inspection image.

13. An apparatus comprising at least one processor and at least one memory including program code, the at least one memory and the program code configured to, with the at least one processor, cause the apparatus to at least:
    obtain at least one inspection image of an at least partially fabricated product;
    cause the at least one inspection image to be processed by a product inspection engine, wherein the product inspection engine comprises a machine learning-trained model;
    obtain an inspection result determined based on the processing of the at least one inspection image by the product inspection engine;
    identify one or more training images from a plurality of images stored in an image database based at least in part on the at least one inspection image;
    associate automatically generated labeling data with the one or more training images based at least in part on the inspection result determined by the processing of the at least one inspection image; and
    cause training of the product inspection engine using the one or more training images and labeling data associated with the one or more training images.

14. The apparatus of claim 13, wherein the at least one memory and the program code are further configured to, with the at least one processor, cause the apparatus to at least:
    receive a functional test result corresponding to the at least partially fabricated product shown in the at least one inspection image; and
    cause the functional test result to be provided to the product inspection engine, wherein the product inspection engine is configured to process the at least one inspection image based at least in part on the functional test result.

15. The apparatus of claim 13, wherein labeling data associated with a training image the one or more training images comprises human annotation data generated based at least in part on user input and the automatically generated labeling data.

16. The apparatus of claim 13, wherein the product inspection engine is configured to divide the at least one inspection image into a plurality of image segments and process each image segment of the plurality of image segments individually, and wherein the inspection result is based at least in part on the processing of each image segment.

17. The apparatus of claim 13, wherein a routing of the at least partially fabricated product within a fabrication facility is performed based at least in part on the inspection result.

18. The apparatus of claim 13, wherein the training images are identified as (a) being substantially similar to the at least one inspection image or (b) having a first image segment that is substantially similar to a second image segment of the at least one inspection image.

19. The apparatus of claim 13, wherein the at least partially fabricated product is at least a portion of a circuit board, a photonic circuit, an electro-optical device, central processing unit (CPU), graphics processing unit (GPU), switch, network adapter, data processing unit (DPU), processing element, or computing chip.

20. A computer program product comprising at least one non-transitory computer-readable storage medium having computer-readable program code portions stored therein, the computer-readable program code portions configured to:
  obtain at least one inspection image of an at least partially fabricated product;
  cause the at least one inspection image to be processed by a product inspection engine, wherein the product inspection engine comprises a machine learning-trained model;
  obtain an inspection result determined based on the processing of the at least one inspection image by the product inspection engine;
  identify one or more training images from a plurality of images stored in an image database based at least in part on the at least one inspection image;
  associate automatically generated labeling data with the one or more training images based at least in part on the inspection result determined by the processing of the at least one inspection image; and
  cause training of the product inspection engine using the one or more training images and labeling data associated with the one or more training images.

21. The method of claim 5, wherein obtaining the inspection result further comprises:
  obtaining an inspection result segment for each image segment processed by the product inspection engine;
  determining a weight for each inspection result segment based on at least an image segment type and image segment characteristics;
  executing a weighted aggregation of the inspection result segments; and
  determining an aggregated likelihood of failure of the at least partially fabricated product based on at least the weighted aggregation of the inspection result segments.

22. The apparatus of claim 16, wherein the at least one memory and the program code are further configured to, with the at least one processor, cause the apparatus to at least:
  obtain an inspection result segment for each image segment processed by the product inspection engine;
  determine a weight for each inspection result segment based on at least an image segment type and image segment characteristics;
  execute a weighted aggregation of the inspection result segments; and
  determine an aggregated likelihood of failure of the at least partially fabricated product based on at least the weighted aggregation of the inspection result segments.

* * * * *